(12) United States Patent
Masuda

(10) Patent No.: US 9,330,611 B2
(45) Date of Patent: May 3, 2016

(54) LIQUID CRYSTAL DISPLAY DEVICE

(71) Applicant: FUJIFILM Corporation, Tokyo (JP)

(72) Inventor: Tomonori Masuda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/617,665

(22) Filed: Feb. 9, 2015

(65) Prior Publication Data

US 2015/0154922 A1 Jun. 4, 2015

Related U.S. Application Data

(63) Continuation of application No. PCT/JP2013/070297, filed on Jul. 26, 2013.

(30) Foreign Application Priority Data

Aug. 20, 2012 (JP) ................................ 2012-181440

(51) Int. Cl.
*G09G 3/34* (2006.01)
*G09G 3/36* (2006.01)
(Continued)

(52) U.S. Cl.
CPC ............ *G09G 3/3426* (2013.01); *G09G 3/2088* (2013.01); *G09G 3/36* (2013.01); *G02F 1/133603* (2013.01); *G02F 2001/133601* (2013.01); *G09G 2320/062* (2013.01);
(Continued)

(58) Field of Classification Search
CPC .................. G09G 3/3426; G09G 3/36; G09G 2320/0646; G09G 2320/066
See application file for complete search history.

(56) References Cited

U.S. PATENT DOCUMENTS

2005/0184952 A1 8/2005 Konno et al.
2007/0212054 A1* 9/2007 Kobayashi ............. G03B 15/03
396/165
(Continued)

FOREIGN PATENT DOCUMENTS

JP 2002-99250 A 4/2002
JP 2005-258403 A 9/2005
(Continued)

OTHER PUBLICATIONS

International Search Report, mailed Oct. 29, 2013, issued in PCT/JP2013/070297.
(Continued)

*Primary Examiner* — Abbas Abdulselam
(74) *Attorney, Agent, or Firm* — Birch, Stewart, Kolasch & Birch, LLP

(57) ABSTRACT

A liquid crystal display device comprising a liquid crystal panel, a backlight, a liquid crystal panel drive controller, and a backlight drive controller determining a luminance pattern defining a magnitude of luminance of each of the plurality of illumination parts on the basis of luminance information corresponding to each area to perform an area control for separately controlling the luminances of the plurality of illumination parts in accordance with the luminance pattern, the backlight drive controller having a special area control mode for performing the area control by determining the luminance pattern common to a plurality of frames of the image displayed on the display region, wherein the backlight drive controller, in the special area control mode, performs computation of an average value of the luminances of respective pixels of the image on the basis of the image signal for the plurality of frames to determine the luminance pattern.

17 Claims, 22 Drawing Sheets

(51) Int. Cl.
*G09G 3/20* (2006.01)
*G02F 1/1335* (2006.01)

(52) U.S. Cl.
CPC .. *G09G2320/066* (2013.01); *G09G 2320/0646* (2013.01); *G09G 2320/0686* (2013.01); *G09G 2360/06* (2013.01); *G09G 2360/16* (2013.01)

(56) References Cited

U.S. PATENT DOCUMENTS

| | | | |
|---|---|---|---|
| 2007/0216819 A1* | 9/2007 | Seetzen | G09G 3/3426 348/844 |
| 2009/0091801 A1* | 4/2009 | Hong | H04N 1/4095 358/464 |
| 2010/0295879 A1 | 11/2010 | Tanaka et al. | |
| 2011/0181794 A1 | 7/2011 | Kobayashi | |
| 2012/0011464 A1* | 1/2012 | Hayashi | H04N 1/00469 715/784 |
| 2012/0154466 A1 | 6/2012 | Kitada | |
| 2014/0168287 A1* | 6/2014 | Wallener | G09G 3/342 345/690 |

FOREIGN PATENT DOCUMENTS

| | | |
|---|---|---|
| JP | 2007-536583 A | 12/2007 |
| JP | 2009-139452 A | 6/2009 |
| JP | 2010-271393 A | 12/2010 |
| JP | 2011-99953 A | 5/2011 |
| JP | 2011-154225 A | 8/2011 |
| JP | 2012-78848 A | 4/2012 |
| JP | 2012-128813 A | 7/2012 |

OTHER PUBLICATIONS

Written Opinion of the International Searching Authority, mailed Oct. 29, 2013, issued in PCT/JP2013/070297.

\* cited by examiner

LIQUID CRYSTAL DISPLAY DEVICE

CROSS-REFERENCE TO RELATED APPLICATIONS

This application is a Continuation of PCT International Application No. PCT/JP2013/070297 filed on Jul. 26, 2013, which claims priority under 35 U.S.C. §119(a) to Japanese Patent Application No. 2012-181440 filed on Aug. 20, 2012. Each of the above application(s) is hereby expressly incorporated by reference, in its entirety, into the present application.

BACKGROUND OF THE INVENTION

1. Field of the Invention

The present invention relates to a liquid crystal display device including a backlight capable of local dimming control.

2. Description of the Related Art

A mobile terminal such as a smartphone, a TV, or various monitors are often provided with a liquid crystal display device as an image display device. The liquid crystal display device includes a liquid crystal panel having liquid crystal elements two-dimensionally arrayed thereon the light transmittance of each of which is adjustable and a backlight (device) emitting a light to the liquid crystal panel.

In recent years, a liquid crystal display device has been known which includes a backlight having a plurality of illumination parts each of which can respectively illuminate each of a plurality of areas, the areas being obtained by dividing a display region of the liquid crystal panel, and performs local dimming control (also referred to as area control) to separately control luminance of each illumination part (see PLT1 to PLT 5). Particularly, in a case where a displayed image has a region locally low in tone and a region locally high in tone, contrast feeling can be improved by the local dimming control.

Such a liquid crystal display device that performs the local dimming control may improve the contrast feeling, while generating a new problem of image quality degradation. For example, a case is explained as an example, as shown in (a) portion to (c) portion of FIG. 21, where an image is displayed in two areas (area 0, area 1) adjacent to each other on the liquid crystal display device in which the image has a high tone portion in the area 0 and no high tone portion in the area 1.

An original image signal illustrated in (a) portion of FIG. 21 schematically shows a tone level (transmittance level of the liquid crystal panel) of the image to be displayed in the area 0 and area 1. A backlight luminance illustrated in (b) portion of FIG. 21 schematically shows luminance of the backlight controlled for each area. Luminance of an output image is that obtained by combining the transmittance of the liquid crystal panel controlled in response to the original image signal and the backlight luminance as illustrated in (c) portion of FIG. 21. At this time, the high luminance of the backlight in the area 0 causes a background portion thereof (portion surrounded by a dotted circle in the figure) to has higher luminance than the area 1, otherwise must have the same luminance as the area 1. In other words, controlling the luminance of the backlight for each area generates differences in brightness in a part which otherwise should have the same brightness to degrade the image quality.

Therefore, a liquid crystal display device described in PLT 6 corrects an original image signal illustrated in (a) portion of FIG. 22 as is illustrated in (b) portion of FIG. 22. Specifically, in order to suppress image degradation due to controlling the luminance of the backlight as illustrated in (c) portion of FIG. 22, an image signal for the area 1 is corrected to be made higher in the level than the original image signal. This, as illustrated in (d) portion of FIG. 22, the output image becomes an image having no image quality degradation correspondingly to the original image signal. In this way, appropriate computation of a signal for driving the liquid crystal panel and a signal for driving the backlight for each frame of the image to be displayed can achieve improvement of the contrast feeling and prevention of the image quality degradation at the same time.

CITATION LIST

Patent Literature

{PLT 1} Japanese Patent Application Laid-Open No. 2010-271393
{PLT 2} Japanese Patent Application Laid-Open No. 2012-078848
{PLT 3} Japanese Patent Application Laid-Open No. 2011-099953
{PLT 4} Japanese Patent Application Laid-Open No. 2011-154225
{PLT 5} Japanese Patent Application Laid-Open No. 2002-099250
{PLT 6} Japanese Patent Application Laid-Open No. 2005-258403

SUMMARY OF THE INVENTION

However, the liquid crystal display device described in PLT 6 needs to compute separately the signal for driving the liquid crystal panel and the signal for driving the backlight for each frame of the image to be displayed, which disables fast response, taking time until the image is displayed. For this reason, for example, the liquid crystal display device for a smartphone cannot respond to rapid change operation made on the displayed image such as a scroll operation or zoom operation of the displayed image instructed by a user.

An object of the present invention is to provide a liquid crystal display device capable of fast response while performing local dimming control.

An imaging apparatus for achieving the object of the present invention includes a liquid crystal panel having a plurality of liquid crystal elements two-dimensionally arrayed thereon, a backlight having a plurality of illumination parts each of which respectively illuminates each of a plurality of areas, the areas being obtained by dividing a display region of the liquid crystal panel, a liquid crystal panel drive controller separately controlling light transmittances of the plurality of liquid crystal elements on the basis of an image signal to display image on the display region, and a backlight drive controller determining a luminance pattern defining a magnitude of luminance of each of the plurality of illumination parts on the basis of luminance information on the image signal corresponding to each area to perform an area control for separately controlling the luminances of the plurality of illumination parts in accordance with this luminance pattern, the backlight drive controller having a special area control mode for performing the area control by determining the luminance pattern common to a plurality of frames of the image displayed on the display region.

According to the invention, the luminance pattern common to a plurality of frames of the image displayed on the display region is determined in the special area control mode, which eliminates a need to determine the luminance pattern for each frame of the image displayed on the display region.

It is preferable that the backlight drive controller, in the special area control mode, performs computation of an average value of the luminances of respective pixels of the image on the basis of the image signal for the plurality of frames to determine the luminance pattern on the basis of a result of this computation. The plural frames can be displayed without any difficulty in the case where the luminance pattern common to plural frames is determined.

It is preferable that the backlight drive controller, in the special area control mode, compares magnitudes of the luminances of the respective pixels of the image on the basis the image signal for the plurality of frames and finds a maximum value of the luminances of the respective pixels to determine the luminance pattern on the basis of this maximum value of the luminances of the respective pixels. The plural frames can be displayed without any difficulty in the case where the luminance pattern common to plural frames is determined. Further, an image having better contrast is obtained as compared to the case where the luminance pattern is determined on the basis of the result of computation of the average value of the luminances of respective pixels of the respective images.

It is preferable to include an operation unit accepting an image change operation to change the image displayed on the display region, and a first image generator generating an image signal for the image corresponding to the image change operation, in which the backlight drive controller performs the special area control mode when the image change operation is made on the operation unit. A response speed of the liquid crystal display device can be improved when the image change operation is made.

It is preferable the image change operation includes a scroll operation of the image and a zoom operation of the image.

It is preferable to include a speed detector detecting a speed of change in the image which changes accompanying the image change operation, in which the backlight drive controller performs an equalization mode for controlling the luminances of the plurality of illumination parts to be equalized when the speed detected by the speed detector is higher than a predetermined threshold. The response speed of the liquid crystal display device can be further improved, particularly when the change speed of the displayed image is fast.

It is preferable to include a second image generator generating an image signal for a low resolution image which has a resolution lower than the image generated by the first image generator on the basis of the image signal for the image generated by the first image generator, in which the liquid crystal panel drive controller separately controls the light transmittances of the plurality of liquid crystal elements on the basis of the image signal for the low resolution image generated by the second image generator when the speed detected by the speed detector is higher than a predetermined threshold. The response speed of the liquid crystal display device can be further improved, particularly when the change speed of the displayed image is fast.

It is preferable to include a storing unit storing image signal for the low resolution image, in which the second image generator generates in advance the image signal for the low resolution image to store the image signal for the low resolution image in the storing unit before liquid crystal panel drive controller determines that the speed is higher than the threshold, and the liquid crystal panel drive controller separately controls the light transmittances of the plurality of liquid crystal elements on the basis of the image signal for the low resolution image read out from the storing unit when the speed detected by the speed detector is higher than a predetermined threshold. The response speed of the liquid crystal display device can be further improved, particularly when the change speed of the displayed image is fast.

It is preferable that the first image generator generates in advance an image signal for the image likely to be displayed on the display region on the basis of the image signal for the image displayed on the display region when the image change operation is made, and when the image change operation is made on the operation unit, the liquid crystal panel drive controller separately controls the light transmittance of the plurality of liquid crystal elements on the basis of the image signal for the image generated in advance by the first image generator, and the backlight drive controller determines the luminance pattern on the basis of the luminance information on the relevant image signal to perform the area control. Generating in advance the image signal for the image corresponding to the image change operation can further improve the response speed of the liquid crystal display device when the image change operation is made.

It is preferable that each of the plurality of illumination parts includes a light emitting diode.

The liquid crystal display device of the invention determines the luminance pattern common to the plural frames of the image displayed on the display region to perform the area control, which eliminates a need to determine the luminance pattern for each frame of the image displayed on the display region, decreasing an amount of time taken for a process of computing a signal for local dimming control (area control). As a result, the fast response is enabled while the local dimming control is performed.

DETAILED DESCRIPTION OF THE PREFERRED EMBODIMENTS

First Embodiment

Smartphone Configuration

Figure 1:
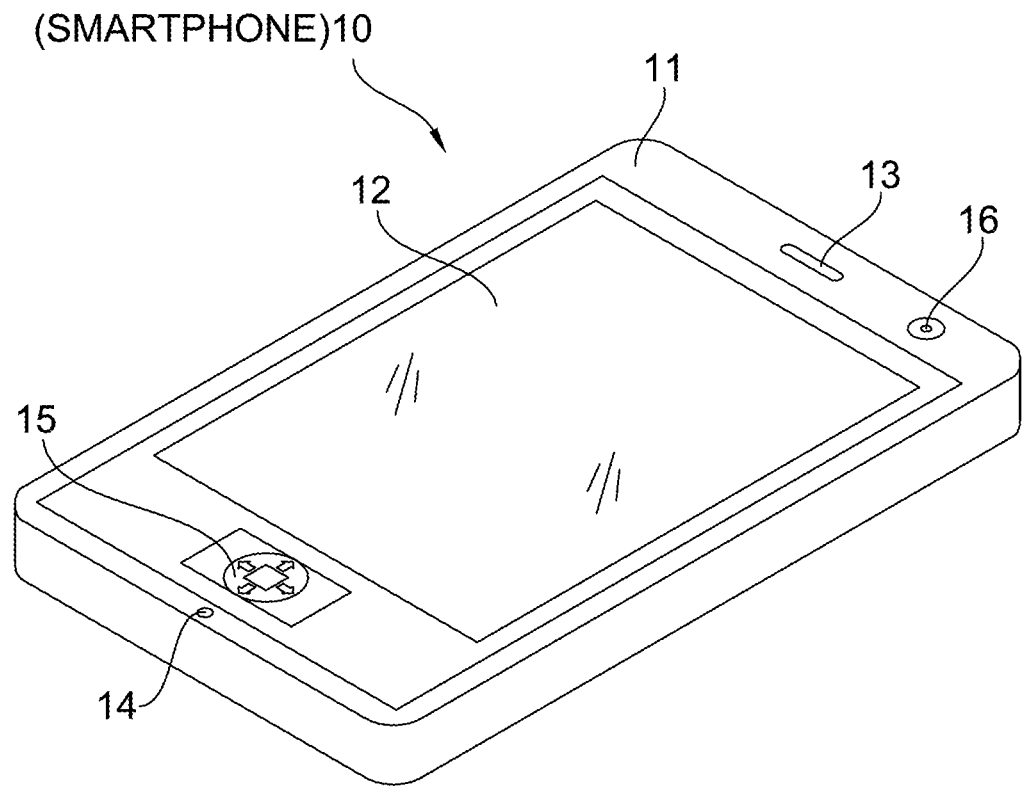
FIG. 1 is a perspective view of a smartphone.

As shown in FIG. 1, a smartphone 10 including a liquid crystal display device according to the present invention has a planar housing 11. The housing 11 has on one surface thereof a liquid crystal display device 12, speaker 13, microphone 14, operation unit 15, and camera unit 16. Note that the configuration of the housing 11 is not limited to this, but, for example, a configuration in which a display part and an input part are independent from each other or a configuration which has a clamshell structure or a slide mechanism may be used.

Figure 2:
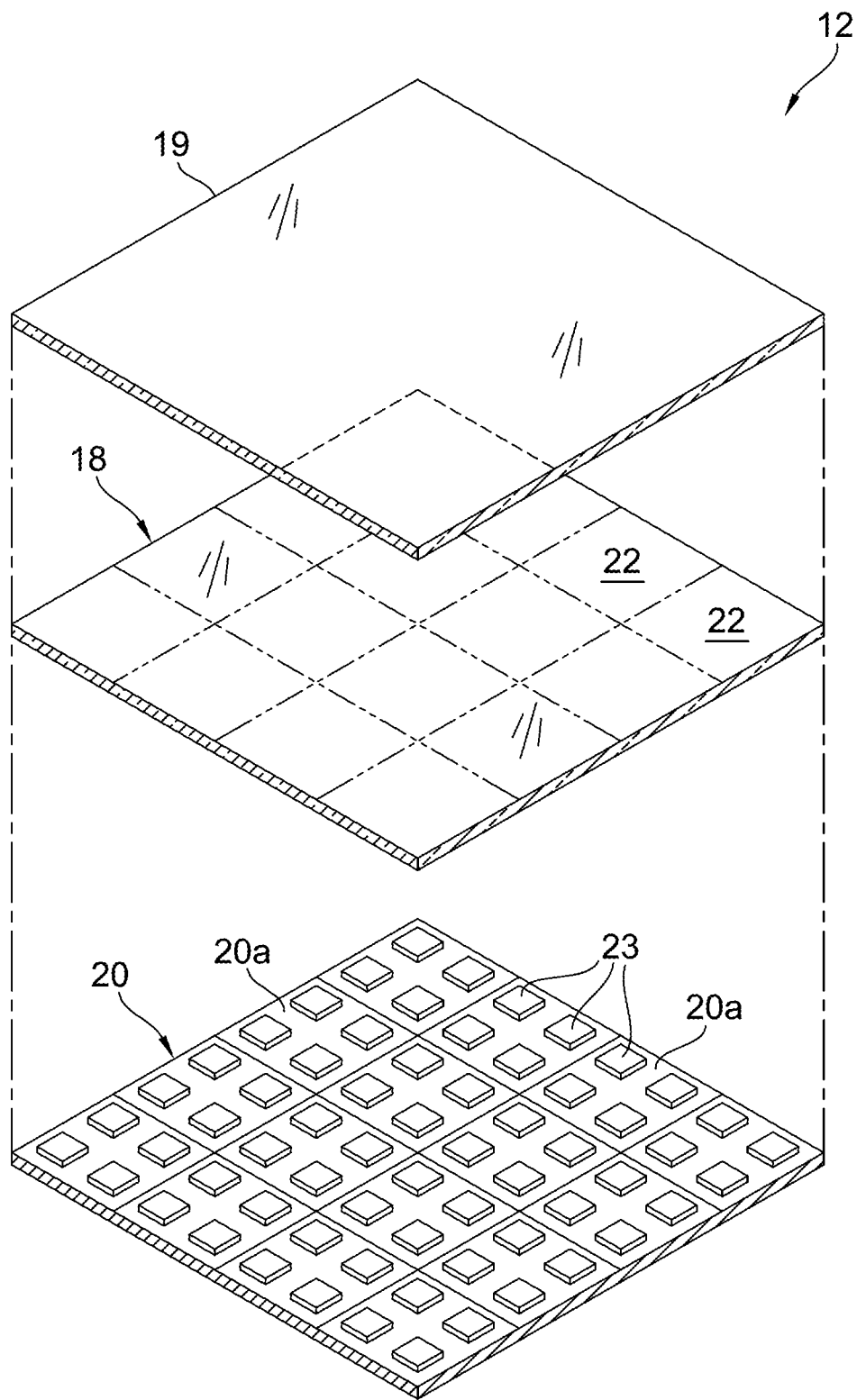
FIG. 2 is an exploded perspective view of a liquid crystal display device.

As shown in FIG. 2, the liquid crystal display device 12 has a so-called touch panel structure for, according to control by a CPU 33, displaying images (still image and moving picture), text information or the like, and detecting a user operation on the displayed information. The liquid crystal display device 12 includes a liquid crystal panel (LCD: Liquid Crystal Display) 18, operation panel 19, and backlight 20.

The liquid crystal panel 18 has a plenty of liquid crystal elements 18a (see FIG. 3) two-dimensionally arrayed thereon light transmittance of each of which is adjustable. In a case where a stereoscopic image (3D image) is watched in the smartphone, the liquid crystal panel 18 capable of stereoscopic viewing such as including a lenticular lens is used.

The operation panel 19, which has a light transmission property, is placed on a display region (surface) of the liquid crystal panel 18. The operation panel 19 is a device detecting one or more coordinates where user's fingers or a stylus operate. When this device is operated by the use's fingers or the stylus, the detected signal having been generated owing to the operation is output to the CPU of the smartphone 10. The CPU detects an operation position (coordinates) on the liquid crystal panel 18 on the basis of the detected signal received.

The operation panel 19 is arranged so as to fully cover the liquid crystal panel 18. In the case of using this arrangement, the operation panel 19 may have a function to detect the user operation also on a region outside the liquid crystal panel 18. In other words, the operation panel 19 may have a detection region for an overlap portion overlapping the liquid crystal panel 18 (hereinafter, referred to as display region) and a detection region for a peripheral portion other than the overlap portion (hereinafter, referred to as non-display region). As a position detecting method used by the operation panel 19 like this, can be cited a matrix switch method, resistance film method, surface acoustic wave method, infrared method, electromagnetic induction method, electrostatic capacitance method and the like.

The backlight 20 is arranged on a back side of the liquid crystal panel 18. The backlight 20 has a plurality of illumination parts 20a each of which can respectively illuminate each of a plurality of areas 22 obtained by dividing a display region of the liquid crystal panel 18. Each illumination part 20a has one or more light emitting diodes (hereinafter, referred to as LED) 23 arranged thereon. Luminances of the respective illumination parts 20a can be separately controlled, which enables a so-called local dimming control (also referred to as area control).

Figure 3:
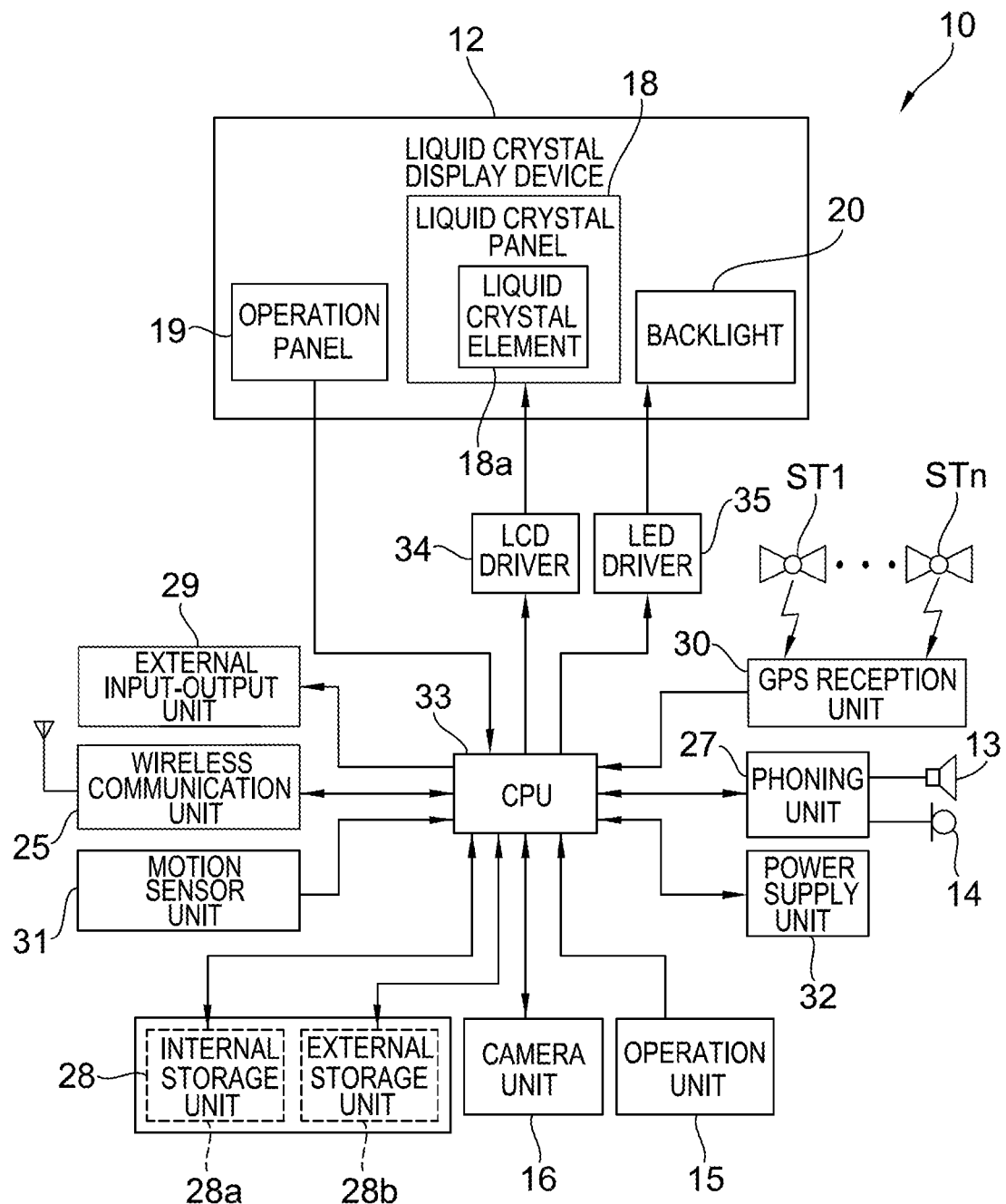
FIG. 3 is a block diagram illustrating an electrical configuration of the smartphone.

As shown in FIG. 3, the smartphone 10 includes, in addition to the liquid crystal display device 12, speaker 13, microphone 14, operation unit 15, and camera unit 16, a wireless communication unit 25, phoning unit 27, storage unit 28, external input-output unit 29, GPS (Global Positioning System) reception unit 30, motion sensor unit 31, power supply unit 32, CPU 33, LCD driver 34, and LED driver 35.

The wireless communication unit 25 performs wireless communication with a base station device installed in a mobile communication network according to an instruction by the CPU 33. By use of the wireless communication, various pieces of file data such as audio data and image data, e-mail data and the like are transmitted and received, and web data, streaming data and the like are received.

The phoning unit 27, which includes the speaker 13 and the microphone 14, converts user's voice input via the microphone 14 into the audio data to output the audio data to the CPU 33 and decodes audio data received by the wireless communication unit 25 or the like to output the audio data from the speaker 13. The installation positions of the speaker 13 and the microphone 14 are not limited to those shown in FIG. 1 and can be appropriately changed.

The operation unit 15 is a hardware key using a push button switch or a cross key, for example, which accepts an instruction from the user. The operation unit 15 is installed on a lower part of the display part of the housing 11 or on a lateral side of the housing 11, for example.

The storage unit 28 stores a control program and control data of the CPU 33, application software, address data associated with a name or telephone number of a person on the other end of the phone, transmitted and received e-mail data and the like, and temporarily stores the streaming data or the like. The storage unit 28 is configured to include an internal storage unit 28a built in the smartphone and an external storage unit 28b having a detachable external memory slot. As the internal storage unit 28a and the external storage unit 28b, various known storage media such as a flash memory type, hard disk type and the like are used.

The external input-output unit 29 serves as an interface with all external devices connected to the smartphone 10 for directly or indirectly connecting with other external devices by way of communication or the like.

The GPS reception unit 30 receives GPS signals transmitted from GPS satellites ST1 to STn and performs positioning arithmetic processing on the basis of the received plural GPS signals to detect a position in latitude, longitude and height of the smartphone 10. This detection result is output to the CPU 33.

The motion sensor unit 31, which includes, for example, a triaxial acceleration sensor or the like, detects physical motions of the smartphone 10. This detects a direction or acceleration which the smartphone 10 moves in or at. This detection result is output to the CPU 33. The power supply unit 32 supplies power stored in a battery (not shown) to the respective units of the smartphone 10.

The CPU 33 operates according to the control program or control data read out from the storage unit 28 to overall control the respective units of the smartphone 10. The CPU 33 performs display control on the liquid crystal panel 18, operation detecting control for detecting the user operation via the operation unit 15, the operation panel 19, or the like.

By performing the display control, the CPU 33 displays an icon to start the application software or a software key such as a scroll bar, or displays a window for creating the e-mail. The scroll bar refers to a software key for accepting an instruction to move a displayed portion of an image when the image is too big to fit into the display region of the liquid crystal panel 18.

By performing the operation detecting control, the CPU 33 detects the user operation via the operation unit 15 accepts, via the operation panel 19, an operation on the above icon or texts input to an input field on the above window, or accepts a request for scroll of the displayed image via the scroll bar.

Further, by performing the operation detecting control, the CPU 33, which determines whether the operation position on the operation panel 19 is on the overlap portion (display region) overlapping the liquid crystal panel 18 or on the peripheral portion (non-display region), other than the overlap portion, not overlapping the liquid crystal panel 18, have a touch panel control function to control a sensing region of the operation panel 19 and a display position of the software key.

The CPU 33 can detect a gesture operation on the operation panel 19 to perform a function set in advance in response to the detected gesture operation. The gesture operation means not a conventional simple touch operation but an operation of tracing by using a finger or the like, designating plural positions at the same time, or tracing from plural positions to at least one position by combining these operations.

The camera unit 16 uses an imaging device such as a CMOS (Complementary Metal Oxide Semiconductor) or a CCD (Charge-Coupled Device) for electronic imaging. The camera unit 16 can convert the image data obtained by imaging into various pieces of compressed image data to store the compressed image data in the storage unit 28 or output the compressed image data via the external input-output unit 29 or wireless communication unit 25. The camera unit 16 may be installed on the back side of the housing 11 or a plurality of camera units 16 may be installed. The camera unit 16 is available for various functions of the smartphone 10. For example, an image acquired by the camera unit 16 can be displayed on the liquid crystal panel 18, or an image by the camera unit 16 is available as one of operations input to the operation panel 19.

The LCD driver 34 controls the light transmittance of each liquid crystal element 18a on the liquid crystal panel 18 under the control by the CPU 33. The LED driver 35 controls the luminance of each illumination part 20a under the control by the CPU 33.

<Configuration Relating to Image Display Process>

Figure 4:
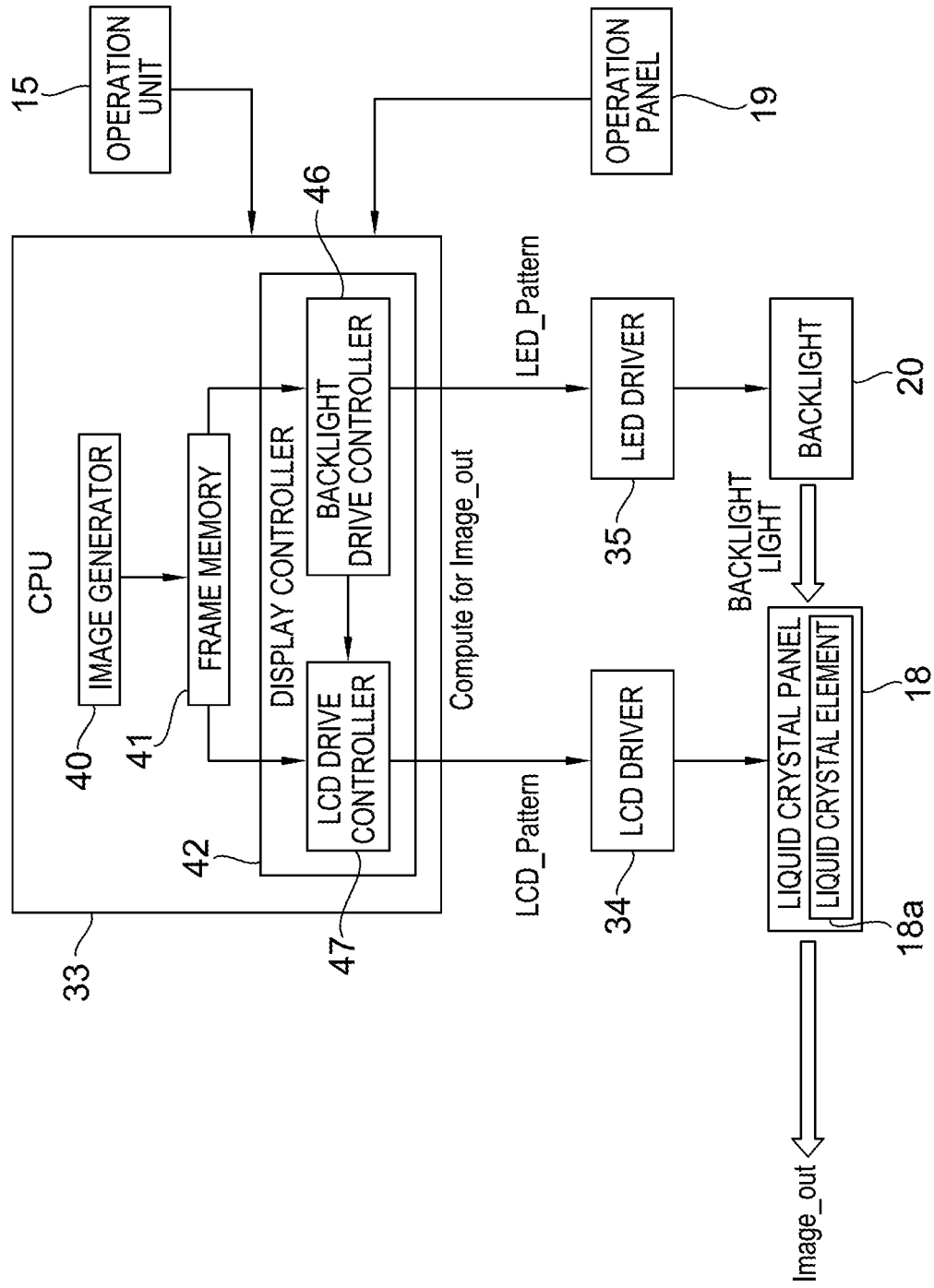
FIG. 4 is a functional block diagram of a CPU.

As shown in FIG. 4, the CPU 33 reads out from the storage unit 28 and performs the control program or application software to function as an image generator 40, frame memory 41, and display controller 42.

The image generator 40 generates a screen on which the icon to start the application software is formed (e.g., desktop screen), a screen for running the application software, and various image signals for displaying an image or the like on the basis of the image data obtained by way of imaging by the camera unit 16 or downloaded image data. The image generator 40, when the scroll operation or zoom operation for the displayed image is performed on the operation unit 15 or operation panel 19, generates an image signal corresponding to each of these operations. The image generator 40 stores the generated image signal in the frame memory 41.

In the frame memory 41, for example, the image signals generated by image generator 40 for a plurality of frames are stored. Then, the image signal for the newest frame generated by the image generator 40 is overwritten on the image signal for the oldest frame stored in the frame memory 41.

The display controller 42 computes an LCD pattern signal and an LED pattern signal (luminance pattern) for driving the liquid crystal element 18a and the backlight 20, respectively, on the basis of image signal read out from the frame memory 41 to output the result to the LCD driver 34 and the LED driver 35, respectively. The display controller 42 is provided with a backlight drive controller 46 and an LCD drive controller 47.

The backlight drive controller 46 analyzes luminance information on the image signal for each area 22 read out from the frame memory 41 to compute the LED pattern signal defining a backlight luminance level for each illumination part 20a. The backlight drive controller 46 outputs the computation result of the backlight luminance level for each illumination part 20a (hereinafter, simply referred to as backlight luminance distribution data) to the LCD drive controller 47. The LED pattern signal is output to the LED driver 35, and the LED driver 35 performs the local dimming control (area control) to control separately the luminances for the respective illumination parts 20a on the basis of the LED pattern signal.

The LCD drive controller 47 corresponds to a liquid crystal panel drive controller according to the invention. The LCD drive controller 47 computes the LCD pattern signal defining a tone for each liquid crystal element 18a (light transmittance for each liquid crystal element 18a) on the basis of the image signal read out from the frame memory 41 and the backlight luminance distribution data input from the backlight drive controller 46. The LCD pattern signal is generated for each frame of the image displayed on the display region of the liquid crystal panel 18 (hereinafter, simply referred to as displayed image), that is, generated for each image signal stored in the frame memory 41. The LCD pattern signal is output to the LCD driver 34. The LCD driver 34 controls the light transmittance for each liquid crystal element 18a on the basis of the LCD pattern signal.

Note "Compute for Image_out" in the figure indicates that the backlight drive controller 46 and the LCD drive controller 47 compute the LCD pattern signal and LED pattern signal, respectively. "LCD_Pattern" and "LED_Pattern" indicate the LCD pattern signal and the LED pattern signal output from the backlight drive controller 46 and the LCD drive controller 47, respectively. "Image_out" indicates output of the image to the liquid crystal panel 18.

The display controller 42 (CPU 33) controls the backlight drive controller 46 to operate in either mode of the normal area control mode and the special area control mode. Specifically, the backlight drive controller 46 is made to operate in the normal area control mode in a case where the image change operation to change the displayed image such as the scroll operation or zoom operation for the displayed image is performed on the operation unit 15 or the operation panel 19, and in the special area control mode other than in that case.

In normal area control mode, the LED pattern signal is computed and output for each frame of the displayed image. In other words, the backlight drive controller 46 computes and outputs the LED pattern signal for each image signal stored in the frame memory 41.

The special area control mode is a mode capable of fast response (fast display) of the liquid crystal display device 12 as compared to the normal area control mode. In the special area control mode, common LED pattern signal is computed and output for every plural frames of the displayed image. In other words, the backlight drive controller 46 computes and outputs the LED pattern signal used in common to the plural frames on the basis of the image signals for the plural frames stored in the frame memory 41.

Figure 5:
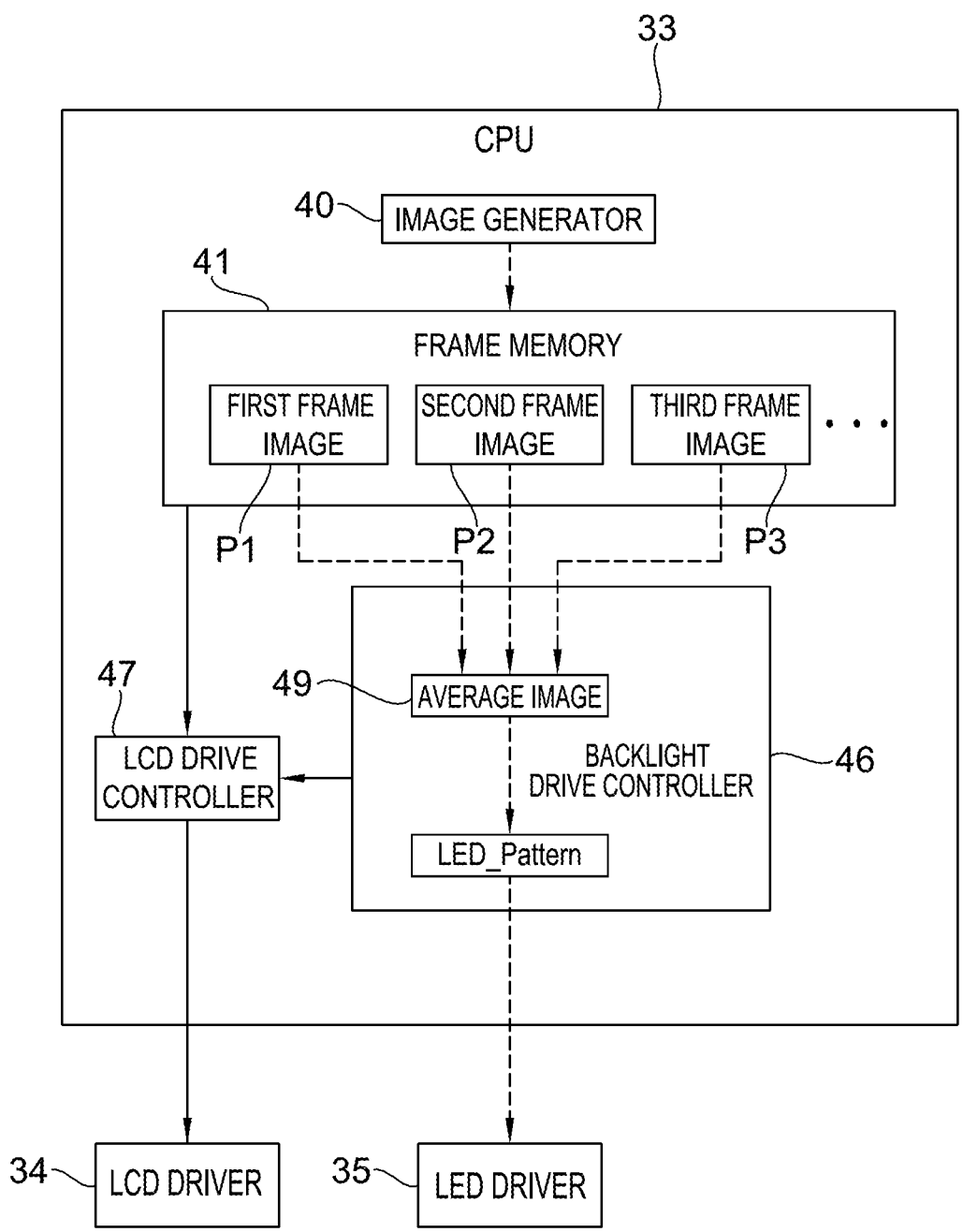
FIG. 5 is an illustration for explaining generation of an average image.

For example, as shown in FIG. 5, in a case where the common LED pattern signal for every three frames of the displayed image is computed, the backlight drive controller 46 reads out the image signals for the images of three frames in total, a first to third frame images P1, P2 and P3, from the frame memory 41. Then, the backlight drive controller 46 finds an average value of the luminances of respective pixels of the respective images on the basis of the image signals for three frames to find an average image 49 of the images of three frames. The backlight drive controller 46 computes and outputs the LED pattern signal on the basis of the image signal for the average image 49. Subsequently, similarly to the above, generation of the average image 49, and computation and output of the LED pattern signal are repeatedly performed on the basis of the image signals for the images of three frames.

In the special area control mode, the backlight drive controller 46 outputs the backlight luminance distribution data computed from the image signal for the average image 49 to the LCD drive controller 47. The backlight luminance distribution data is used in common for generating the LCD pattern signals for three frames. The LCD drive controller 47 generates the LCD pattern signals for respective three frames on the basis of the image signals for the images of three frames and the common backlight luminance distribution data.

Figure 6:
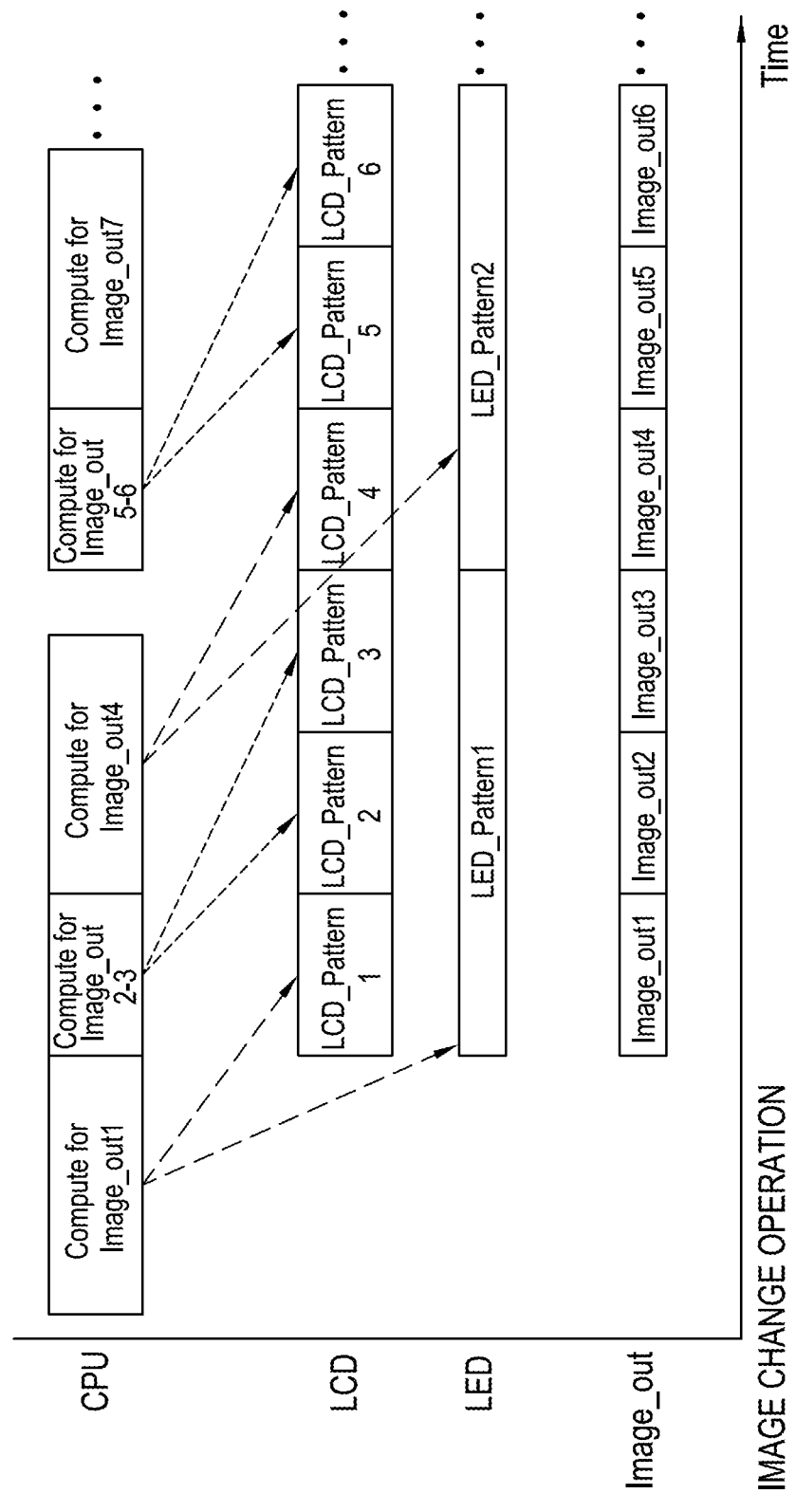
FIG. 6 is an illustration for explaining a process of computing LCD and LED pattern signals.

By use of FIG. 6, a description is specifically given of operations of the display controller 42 (backlight drive controller 46 and LCD drive controller 47) in the special area control mode. The display controller 42 (backlight drive controller 46 and LCD drive controller 47) computes the LED pattern signal (LED_Pattern1) and the LCD pattern signal (LCD_Pattern1), respectively (Compute for Image_out1), when the image change operation such as the scroll operation is made. Specifically, the average image 49 is generated from the image signals for the first to third frame images P1, P2, and P3 and the image signal for the average image 49 is analyzed to compute "LED_Pattern1". Additionally, "LCD_Pattern1" is computed on the basis of the image signal for the first frame image P1 and the backlight luminance distribution data of the average image 49. When these "LED_Pattern1" and "LCD_Pattern1" are output to the LED driver 35 and the LCD driver 34, respectively, the first frame image is displayed on the liquid crystal panel 18 (Image_out1).

After "Compute for Image_out1", the display controller 42 computes "LCD_Pattern2" on the basis of the image signal for the second frame image P2 and the previously obtained backlight luminance distribution data of the average image 49 (Compute for Image_out2). Since the common LED pattern signal (LED_Pattern1) is used in displaying the first to third frame images, the LED pattern signal is not computed in "Compute for Image_out2". When "LED_Pattern1" and "LCD_Pattern2" are output to the LED driver 35 and the LCD driver 34, respectively, the second frame image is displayed on the liquid crystal panel 18 (Image_out2).

After "Compute for Image_out2", the display controller 42 computes "LCD_Pattern3" on the basis of the image signal for the third frame image P3 and the backlight luminance distribution data of the average image 49 (Compute for Image_out3). In "Compute for Image_out3" also, the LED pattern signal is not computed similarly to "Compute for Image_out2". When "LED_Pattern1" and "LCD_Pattern3" are output to the LED driver 35 and the LCD driver 34, respectively, the third frame image is displayed on the liquid crystal panel 18 (Image_out3).

After "Compute for Image_out3", the display controller 42 computes "LED_Pattern2" and "LCD_Pattern4" (Compute for Image_out4). Specifically, the image signal for the average image 49 generated from image signals for fourth to sixth frame images is analyzed to compute "LED_Pattern2". Additionally, "LCD_Pattern4" is computed on the basis of the image signal for the fourth frame image and the backlight luminance distribution data of the average image 49. When "LED_Pattern2" and "LCD_Pattern4" are output to the LED driver 35 and the LCD driver 34, respectively, the fourth frame image is displayed on the liquid crystal panel 18 (Image_out4).

After "Compute for Image_out4", the display controller 42 performs "Compute for Image_out5" for computing "LCD_Pattern5" and "Compute for Image_out6" for computing "LCD_Pattern6" in this order. When "LED_Pattern2" and "LCD_Pattern5" are output and "LED_Pattern2" and "LCD_Pattern6" are output in this order, the fifth frame image and the sixth frame image are displayed on the liquid crystal panel 18 (Image_out5, Image_out6).

Subsequently, similarly to the above, the LED pattern signal (LED_Pattern) and the LCD pattern signal (LCD_Pattern) are computed at intervals of three frames [(1+3M) frames: M is an integer not less than zero], and other than that, only the LCD pattern signal (LCD_Pattern) is computed.

<Smartphone Workings in First Embodiment>

Figure 7:
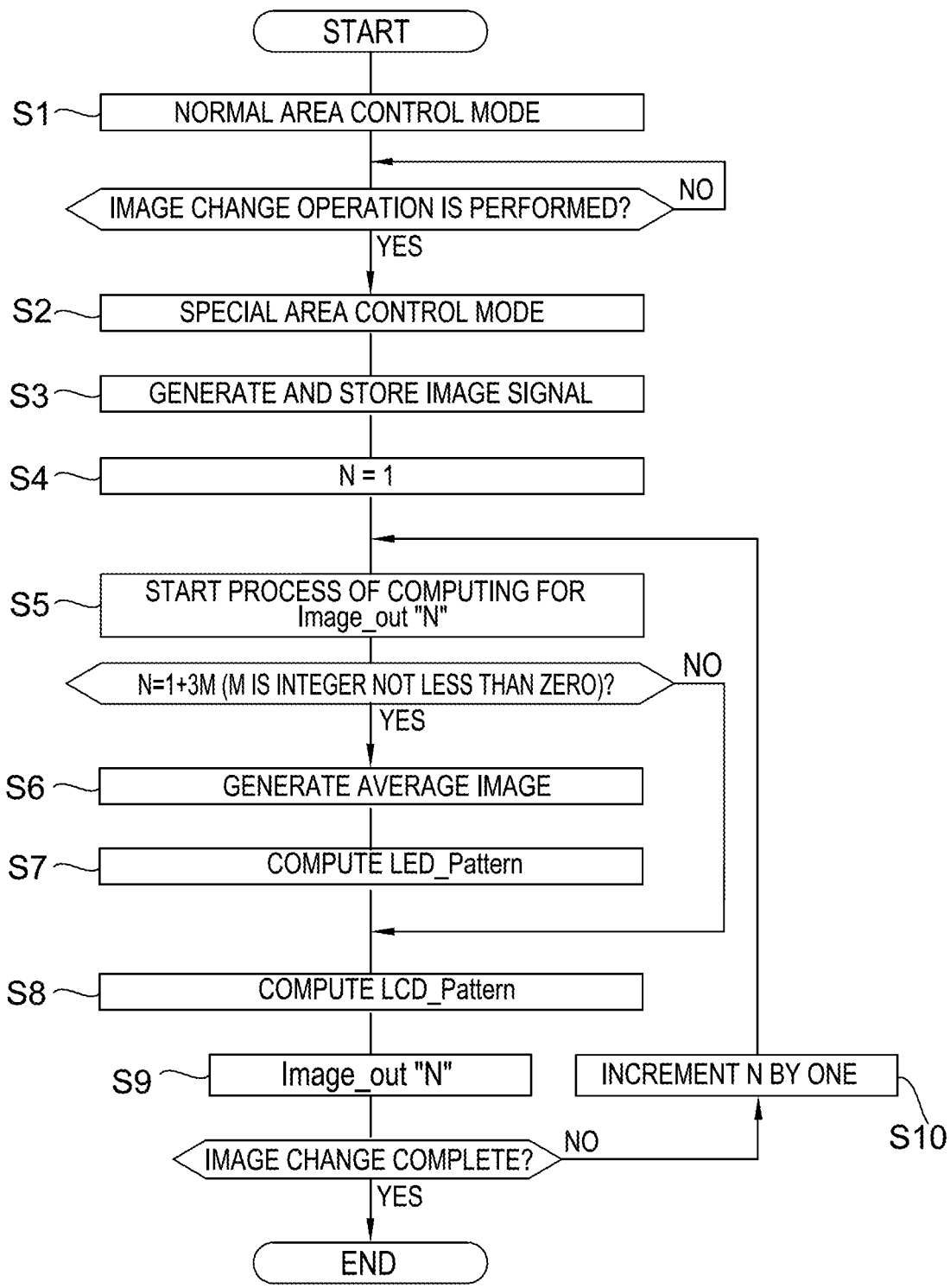
FIG. 7 is a flowchart showing a flow of a display process of the smartphone in a first embodiment.

Next, a description is given of workings of the smartphone 10 having the above configuration using a flowchart shown in FIG. 7. In the smartphone 10, when a start operation of the desktop screen or a start operation of the application software is performed, the image generator 40 generates and stores the image signal for the image to be displayed and the display controller 42 performs the display control. This allows the liquid crystal panel 18 to display various displayed images such as the desktop screen and an application software execution screen.

Before the image change operation such as the scroll operation of the displayed image is performed, the display controller 42 controls the backlight drive controller 46 to operate in the normal area control mode (step S1). This allows the LED pattern signal and LCD pattern signal to be computed for each frame of the displayed image (for each image signal stored in the frame memory 41) (see (A) portion of FIG. 9).

When the image change operation, for example, the scroll operation of the displayed image is performed on the operation unit 15 or the operation panel 19, the display controller 42 switches an operation mode of the backlight drive controller 46 from the normal area control mode to the special area control mode (step S2).

Figure 8:
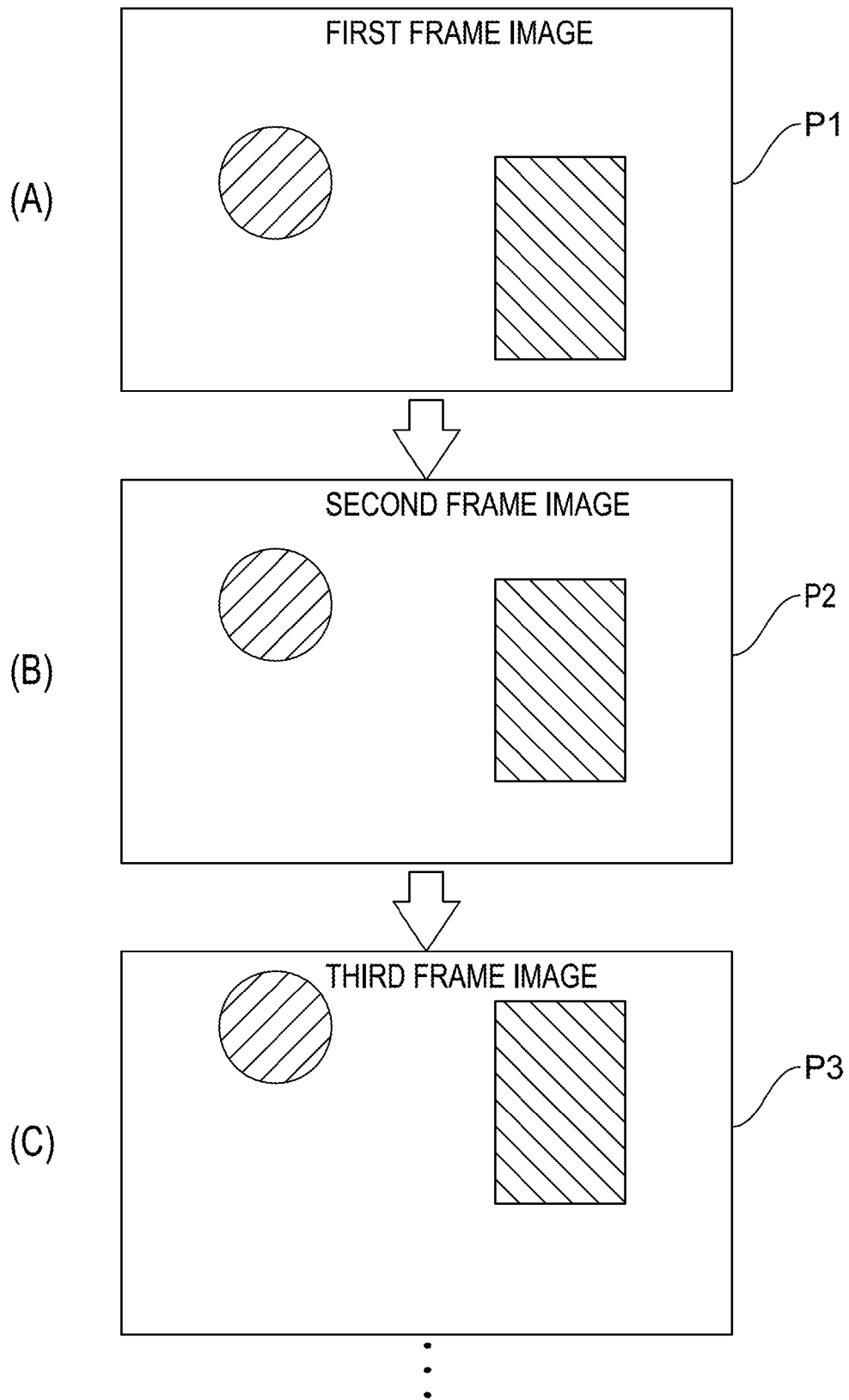
FIG. 8 is an illustration for explaining a scroll operation of image change operations.

At this time, as shown in (A) portion, (B) portion, and (C) portion of FIG. 8, the image generator 40 generates the image signal for the displayed image corresponding to the scroll operation to store the image signal in the frame memory 41. This stores, for example, the image signals for plural frame images for gradually sliding the original displayed image in a scroll direction (first frame image P1, second frame image P2, third frame image P3, . . . ) in the frame memory 41 (step S3).

Returning to FIG. 7, the display controller 42 starts "Compute for Image_out1" for a process of computing the pattern signal for displaying the first frame image (Image_out1: N=1) (steps S4, S5).

The backlight drive controller 46 reads out the image signals for the first to third frame images P1, P2, and P3 from the frame memory 41 to generate the average image 49 from the image signals for the respective frame images P1, P2, and P3 (step S6). Next, the backlight drive controller 46 analyzes the image signal for the average image 49 (luminance information or the like) to compute the LED pattern signal "LED_Pattern1", and thereafter, outputs this "LED_Pattern1" to the LED driver 35 (step S7). The backlight drive controller 46 outputs the backlight luminance distribution data computed from the image signal for the average image 49 to the LCD drive controller 47.

At this time, the LED pattern signal used in common to the first to third frame images P1, P2, and P3 may be found from, for example, only the image signal for the first frame image, but in the case of using an LED pattern signal optimized for the first frame image, the LCD pattern signals corresponding to the second and third frame images cannot be possibly found. For this reason, computation of the LED pattern signal on the basis of the image signal for the average image 49 of the respective frame images ensures that the LCD pattern signals each correspond to the respective frame images are computed. This allows plural frames to be displayed without any difficulty in the case where the luminance pattern common to plural frames is determined.

The LCD drive controller 47 computes the LCD pattern signal "LCD_Pattern1" on the basis of the image signal for the first frame image read out from the frame memory 41 and the backlight luminance distribution data acquired from the backlight drive controller 46, and thereafter, outputs this "LCD_Pattern1" to the LCD driver 34 (step S8).

The LED driver 35 separately controls the luminances of the respective illumination parts 20a on the basis of "LED_Pattern1". The LCD driver 34 controls the light transmittance (tone) of each liquid crystal element 18a on the basis of "LCD_Pattern1". This allows the first frame image to be displayed, "Image_out1", on the liquid crystal panel 18 (step S9).

The display controller 42, after completion of "Compute for Image_out1", starts "Compute for Image_out2" for a process of computing the pattern signal for displaying the second frame image (Image_out2: N=2) (steps S10, S5).

The backlight drive controller 46, which already have computed the LED pattern signal "LED_Pattern1" used in common for displaying the first to third frame images, does not newly compute the LED pattern signal and outputs the previously computed "LED_Pattern1" to the LED driver 35. On the other hand, the LCD drive controller 47 computes the LCD pattern signal "LCD_Pattern2" on the basis of the image signal for the second frame image read out from the frame memory 41 and the previously acquired backlight luminance distribution data, and thereafter, outputs "LCD_Pattern2" to the LCD driver 34 (step S8). In this way, in "Compute for Image_out2", the LED pattern signal is not computed, decreasing an amount of computation time as compared to "Compute for Image_out1".

The LED driver 35 separately controls the luminances of the respective illumination parts 20a on the basis of "LED_Pattern1" and the LCD driver 34 controls the light transmittance (tone) of each liquid crystal element 18a on the basis of "LCD_Pattern2". This allows the second frame image to be displayed, "Image_out2", on the display region of the liquid crystal panel 18 (step S9).

The display controller 42, after completion of "Compute for Image_out2", starts "Compute for Image_out3" for a process of computing the pattern signal for displaying the third frame image (Image_out3: N=3) (steps S10, S5). The backlight drive controller 46 outputs the previously computed "LED_Pattern1" to the LED driver 35. On the other hand, the LCD drive controller 47 computes the LCD pattern signal "LCD_Pattern3" on the basis of the image signal for the third frame image read out from the frame memory 41 and the previously acquired backlight luminance distribution data to output the LCD pattern signal "LCD_Pattern3" to the LCD driver 34 (step S8). This allows the third frame image to be displayed, "Image_out3", on the display region of the liquid crystal panel 18 (step S9).

Subsequently, similarly to the above, the display controller 42 performs "Compute for Image_out4", "Compute for Image_out5", "Compute for Image_out6", . . . , and "Compute for Image_outN" in this order to compute and output the respective pattern signals, and thereby scrolls the displayed image on the liquid crystal panel 18 in response to the scroll operation. The processes of step S5 to step S9 described above are repeatedly performed until the scroll operation is completed. Note the image generator 40 successively generates and stores the frame image corresponding to the scroll operation, though the illustration thereof is omitted.

The display controller 42, in "Compute for Image_out" for a process of computing the pattern signal for displaying the N=(1+3M)th frame image, computes the LED pattern signal and the LCD pattern signal. On the other hand, the display controller 42, in "Compute for Image_out" for a process of computing the pattern signal for displaying the N≠(1+3M)th frame image, computes only the LCD pattern signal. This simplifies the process of computing in the N≠(1+3M)th "Compute for Image_out", decreasing an amount of processing time.

Figure 9:
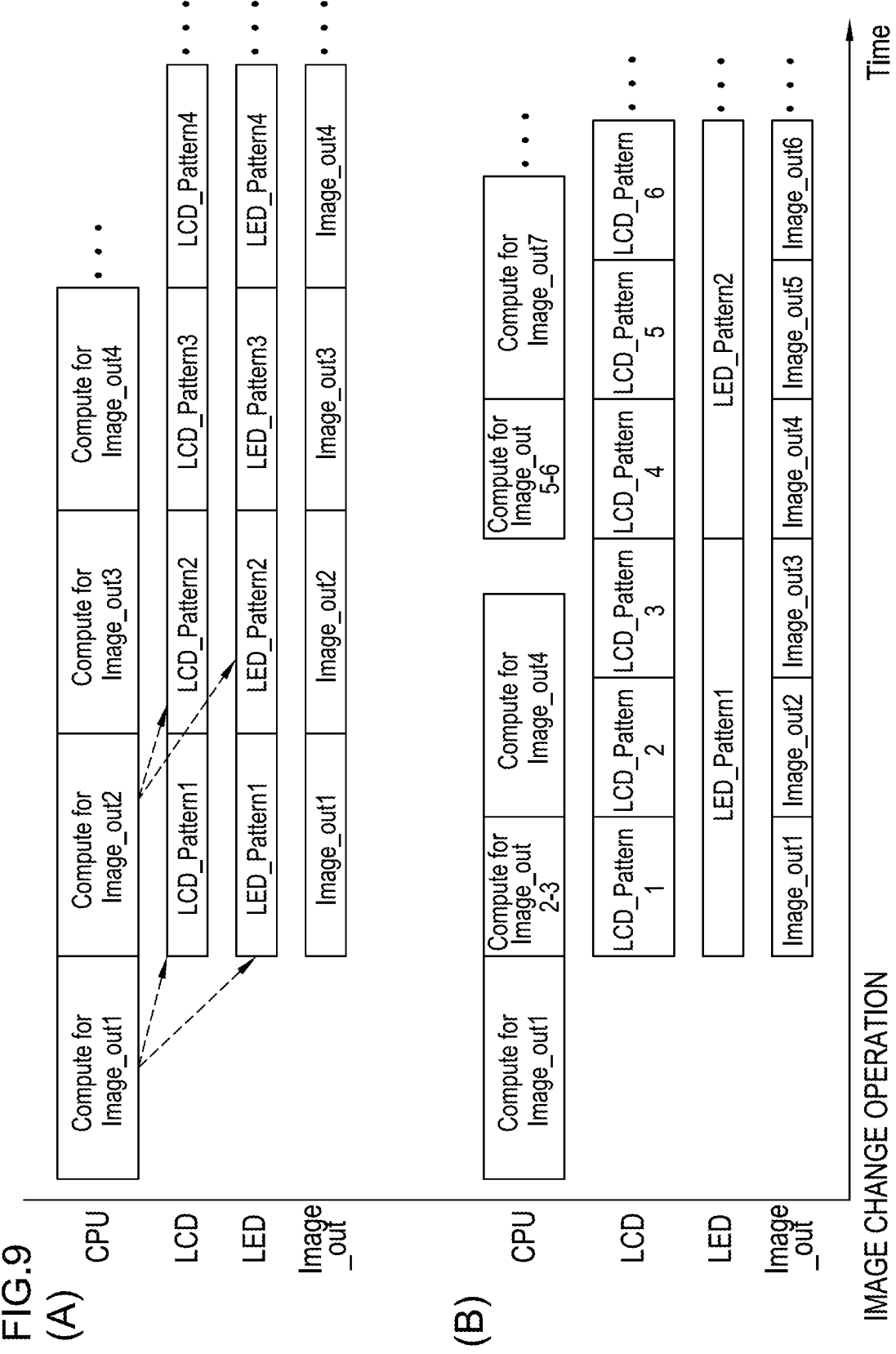
FIG. 9 is a comparison diagram for comparing processes of computing the LCD and LED pattern signals in (A) for a normal area control mode and (B) for a special area control mode.

In (A) portion of FIG. 9 showing a comparison example, the normal area control mode of related art performs the process of computing the LED pattern signal "LED_Pattern" and the LCD pattern signal "LCD_Pattern" for each frame image of the displayed image. For this reason, if both the LED pattern signal and the LCD pattern signal are to be changed at the same time in response to the change in the displayed image due to the scroll operation and the like, the process of computing takes time, reducing a response speed (change speed involved by the scroll operation).

<Smartphone Workings Effect in First Embodiment>

In contrast to this, as shown in (B) portion of FIG. 9, the special area control mode according to the invention performs the process of computing the LCD pattern signal "LCD_Pattern" with the LED pattern signal "LED_Pattern" being fixed for plural frames, decreasing the number of times of computing the LED pattern signal as compared to the normal area control mode. This simplifies the process of computing. Particularly, in "Compute for Image_outN" (N≠(1+3M)), the LED pattern signal "LED_Pattern" is already determined and only the LCD pattern signal "LCD_Pattern" corresponding to this LED pattern signal "LED_Pattern" may be computed (back calculation), which can simplify the process of computing. As a result of this, the amount of processing time for "Compute for Image_outN" (N≠(1+3M)) is decreased, decreasing the whole computation processing time of the CPU 33 involved by the scroll operation. This improves the response speed of the liquid crystal display device 12 in the scroll operation

[Smartphone in Second Embodiment]

Figure 10:
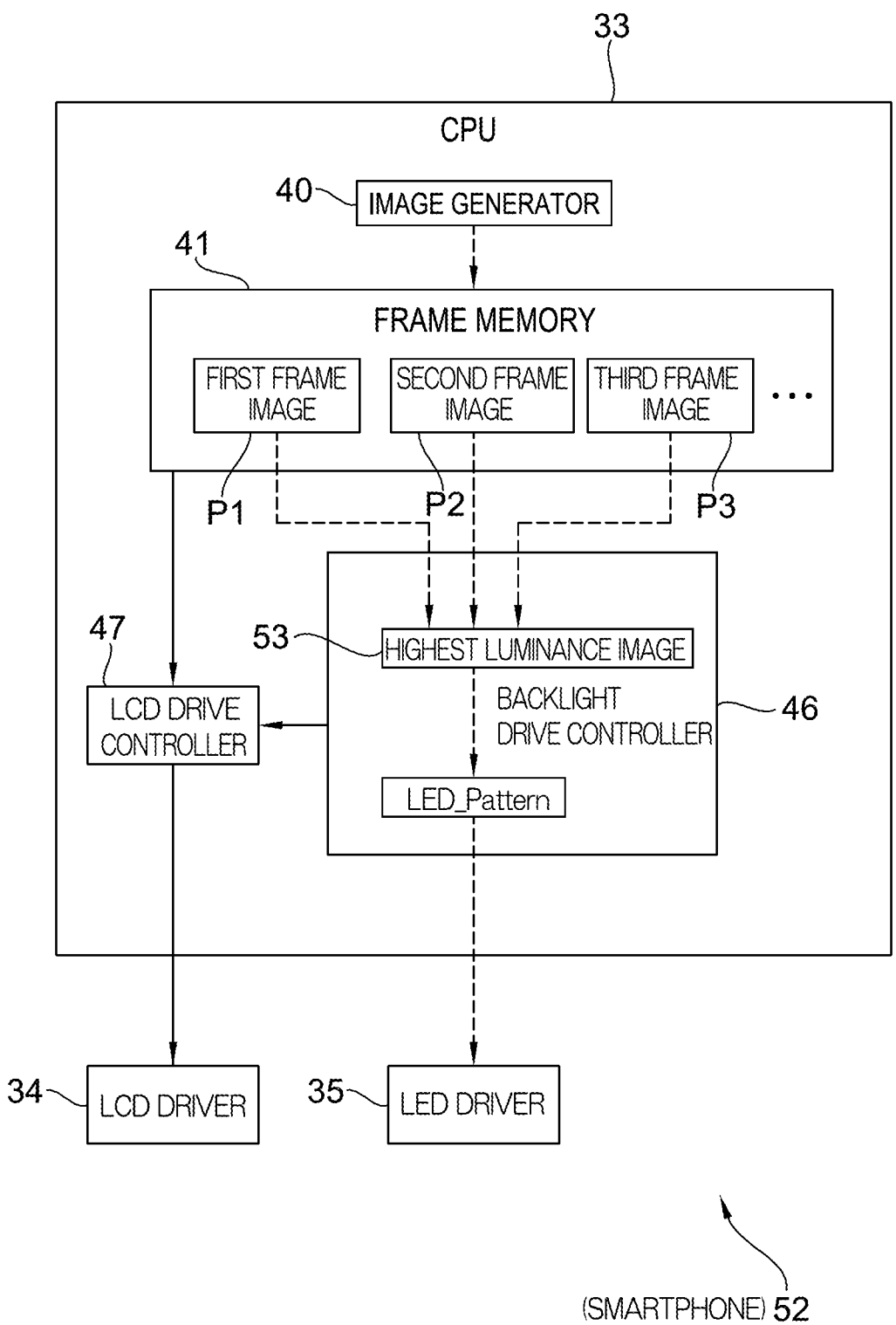
FIG. 10 is a block diagram illustrating an electrical configuration of a smartphone for computing an LED pattern signal using a highest luminance image in a second embodiment.

Next, a description is given of a smartphone 52 according to a second embodiment of the invention using FIG. 10. In the first embodiment above, the LED pattern signal is computed from the image signal for the average image 49 generated from plural frame images, but in the smartphone 52 in the second embodiment, the highest luminance image is generated from plural frame images (see FIG. 11) to compute the LED pattern signal from the image signal for the highest luminance image.

Note the smartphone 52 has the basically same configuration as the smartphone 10 in the first embodiment except for computing the LED pattern signal from the highest luminance image instead of the average image 49. Because of this, those having the same function and configuration as in the first embodiment above are designated with the same reference numerals and characters, and the description thereof is omitted.

The backlight drive controller 46 in the second embodiment, when switched to the special area control mode, reads out the image signals for the images of three frames in total, the first to third frame images P1, P2, and P3, from the frame memory 41 similarly to the first embodiment.

Figure 11:
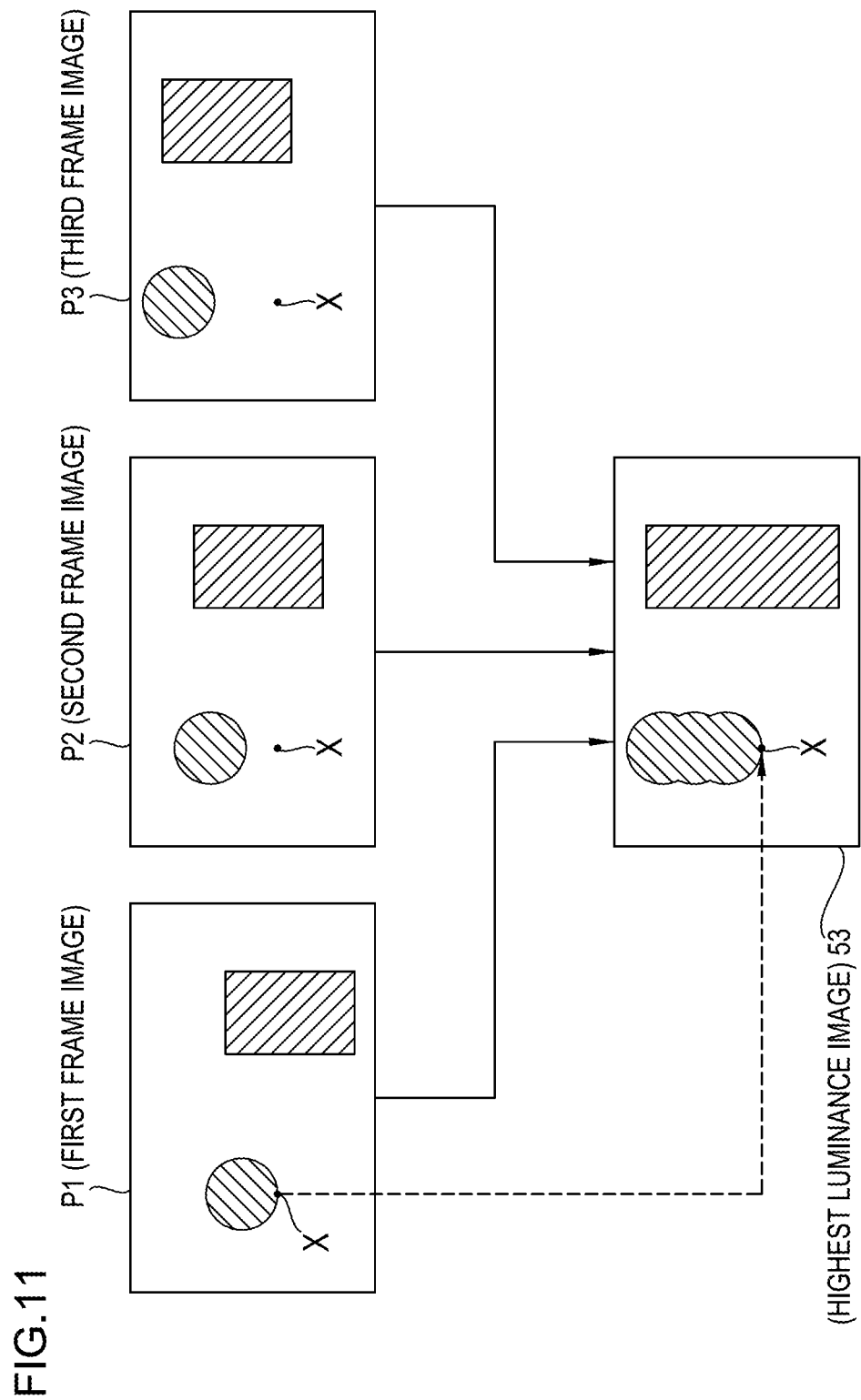
FIG. 11 is an illustration for explaining the highest luminance image.

Next, as shown in FIG. 11, the backlight drive controller 46 compares magnitudes of the luminances of the respective pixels of the respective images on the basis of the image signals for three frames to find the maximum value of the luminances of the respective pixels. Then, the backlight drive controller 46 extracts the pixel having the maximum value of luminance from the images of three frames to generate the highest luminance image 53. For example, in a case where compared are the magnitudes of the luminances of pixels X at the same coordinates in the first to third frame images P1, P2, and P3, the pixel X in the first frame image P1 is extracted which has the maximum luminance. Subsequently, similarly to the above, the magnitudes of the luminances of another coordinates in the frame images P1, P2, and P3 are compared to extract a pixel in the frame image having the maximum luminance. This allows the highest luminance image 53 to be generated.

The backlight drive controller 46 computes and outputs the LED pattern signal on the basis of the image signal for the highest luminance image 53. Subsequently, similarly to the above, the backlight drive controller 46 repeatedly performs generation of the highest luminance image 53, and computation and output of the LED pattern signal on the basis of the image signals for the images of three frames.

In this way, the common LED pattern signal is generated on the basis of the image signal for the highest luminance image 53 generated from plural frame images (e.g., first to third frame images), which ensures that the LCD pattern signals each correspond to the respective frame images are computed similarly to the first embodiment. Further, an image having better contrast is obtained as compared to the case where the LED pattern signal is generated on the basis of the image signal for the average image of the respective frame images.

[Smartphone in Third Embodiment]

Figure 12:
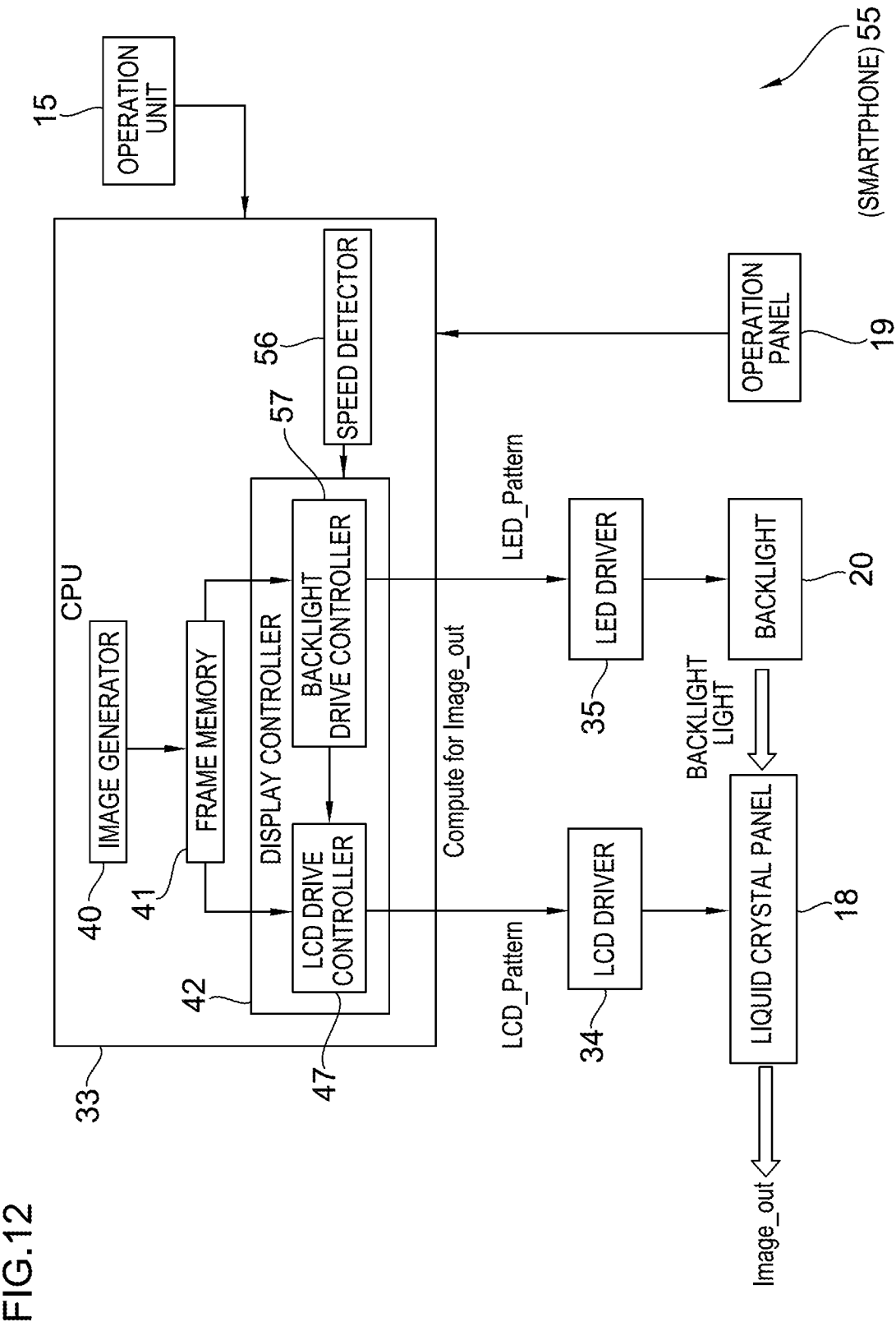
FIG. 12 is a block diagram illustrating an electrical configuration of a smartphone having an equalization mode for equalizing luminance between respective illumination parts in a third embodiment.

Next, a description is given of a smartphone 55 according to a third embodiment of the invention using FIG. 12. In the first embodiment above, the backlight drive controller 46 is made to operate in the special area control mode when the image change operation such as the scroll operation is made. In contrast to this, the smartphone 55 in the third embodiment switches the control mode for the backlight drive controller 46 depending on a result of detecting a speed (scroll speed, zoom speed or the like) of the change in the displayed image involved by the image change operation.

The smartphone 55 has the basically same configuration as the smartphone 10 in the first embodiment above except that the CPU 33 is provided with a speed detector 56 and a backlight drive controller 57, and therefore, those having the same function and configuration as in the first embodiment above are designated with the same reference numerals and characters, and the description thereof is omitted.

The speed detector 56, when the image change operation such as the scroll operation is made, detects the change speed of the displayed image involved by this operation. Specifically, the change speed of the displayed image is detected by determining an operating speed of the image change operation made on the operation unit 15 or the operation panel 19 on the basis of an operation signal input from the operation unit 15 or the operation panel 19 to the CPU 33. The more an amount of scroll or an enlargement ratio instructed by the image change operation, or the less a reduction ratio, the more the change speed of the image increases. For this reason, at least any of these parameters may be determined on the basis of the operation signal described above to detect the change speed of the displayed image. Further, the change speed of the displayed image may be detected on the basis of the number of frames of the displayed images or the like which the image generator 40 generates accompanying the image change operation. The speed detector 56 inputs a result of detecting the change speed of the displayed image to the display controller 42.

The backlight drive controller 57 is basically the same as the backlight drive controller 46 in the first and second embodiment, but has an equalization mode in addition to the normal area control mode and special area control mode described above. In the case where the image change operation such as the scroll operation is performed, if the change speed of the displayed image detected by the speed detector 56 is higher than a predetermined threshold, the backlight drive controller 57 operates in the equalization mode.

The backlight drive controller 57, when set to the equalization mode, controls the luminances of the respective illumination parts 20a to be equalized at a predetermined value. In other words, in the equalization mode, the control similar to the typical liquid crystal display device is performed in which the local dimming control is not performed. Note values of the luminances of the respective illumination parts 20a are set to a certain value (e.g., maximum luminance value) when the scroll operation or zoom operation is performed as the image change operation, and set to an optimum value corresponding to a type of the displayed image when a switching operation is performed to switch the displayed image.

<Smartphone Workings in Third Embodiment>

Figure 13:
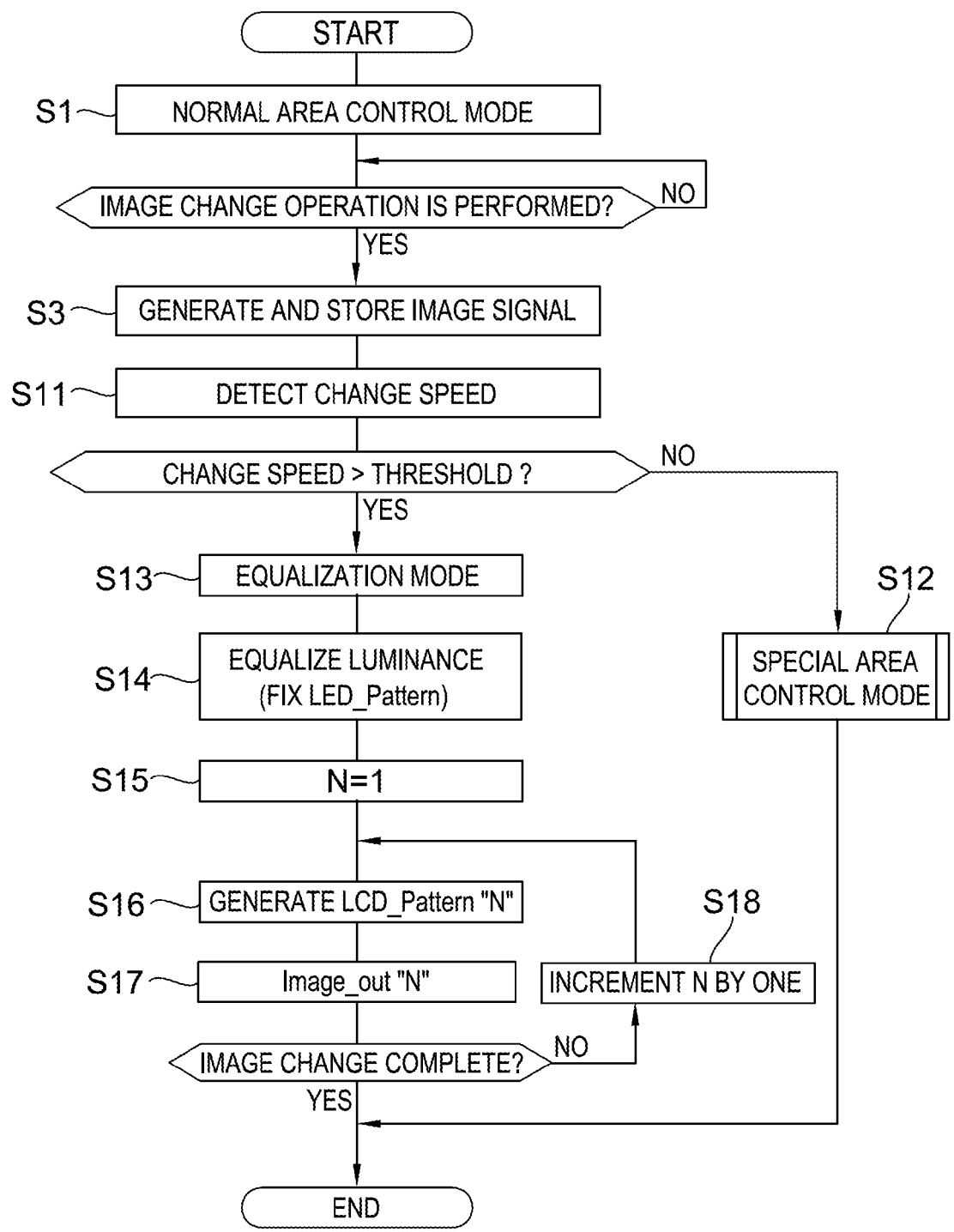
FIG. 13 is a flowchart showing a flow of a display process of the smartphone in the third embodiment.

A description is given of workings of the smartphone 55 having the above configuration using a flowchart shown in FIG. 13. Note the processes until the image change operation such as the scroll operation is performed are the same as those in the first embodiment described above, and therefore, the description thereof is omitted.

When the image change operation, for example, the scroll operation, is performed on the operation unit 15 or the operation panel 19, the image generator 40 generates the image signal for the displayed image corresponding to the scroll operation to store the image signal in the frame memory 41 (step S3). The speed detector 56 determines, for example, the operating speed of the scroll operation on the basis of the operation signal or the like from the operation unit 15 or the operation panel 19 to detect the scroll speed (change speed) of the displayed image (step S11). The detection result of the scroll speed is input to the display controller 42.

In a case where the scroll speed (change speed) detected by the speed detector 56 is equal to or lower than the predetermined threshold, the display controller 42 switches the operation mode of the backlight drive controller 57 to the special area control mode (step S12). In this case, the process similar to that in the first embodiment shown in FIG. 7 is performed.

On the other hand, in a case where the scroll speed detected by the speed detector 56 is higher than the predetermined threshold, the display controller 42 switches the operation mode of the backlight drive controller 57 to the equalization mode (step S13). The backlight drive controller 57 determines the LED pattern signal "LED_Pattern" such that the luminances of the respective illumination parts 20*a* are equalized (flattened) at a certain value to output this "LED_Pattern" to the LED driver 35 (step S14). "LED_Pattern" is fixed in the equalization mode.

Next, the display controller 42 starts "Compute for Image_out1" for a process of computing the pattern signal for displaying the first frame image (Image_out1: N=1) (step S15). Since "LED_Pattern" is fixed, the backlight drive controller 57 does not perform the process of computing. The LCD drive controller 47 computes the LCD pattern signal "LCD_Pattern1" on the basis of the image signal for the first frame image read out from the frame memory 41 and the equalized luminance values of the respective illumination parts 20*a*, and thereafter, outputs this "LCD_Pattern1" to the LCD driver 34 (step S16).

The LED driver 35 controls the luminances of the respective illumination parts 20*a* to be equalized on the basis of the fixed "LED_Pattern". The LCD driver 34 controls the light transmittance (tone) of each liquid crystal element 18*a* on the basis of "LCD_Pattern1". This allows the first frame image to be displayed, "Image_out1", on the display region of the liquid crystal panel 18 (step S17).

The display controller 42, after completion of "Compute for Image_out1", starts "Compute for Image_out2" for a process of computing the pattern signal for displaying the second frame image (Image_out2: N=2) (steps S18, S16).

The backlight drive controller 57 outputs the fixed "LED_Pattern" to the LED driver 35 without performing the process of computing. On the other hand, the LCD drive controller 47 computes the LCD pattern signal "LCD_Pattern2" on the basis of the image signal for the second frame image read out from the frame memory 41 or the like to output the LCD pattern signal "LCD_Pattern2" to the LCD driver 34 (step S16). This allows the second frame image to be displayed, "Image_out2", on the liquid crystal panel 18 (step S17).

Subsequently, similarly to the above, the display controller 42 performs "Compute for Image_out3", "Compute for Image_out4", . . . , and "Compute for Image_outN" in this order to perform the process of computing and outputting the LCD pattern signal. This scrolls the displayed image on the liquid crystal panel 18 in response to the scroll operation. These processes of computing and outputting are repeatedly performed until the scroll operation is completed.

Figure 14:
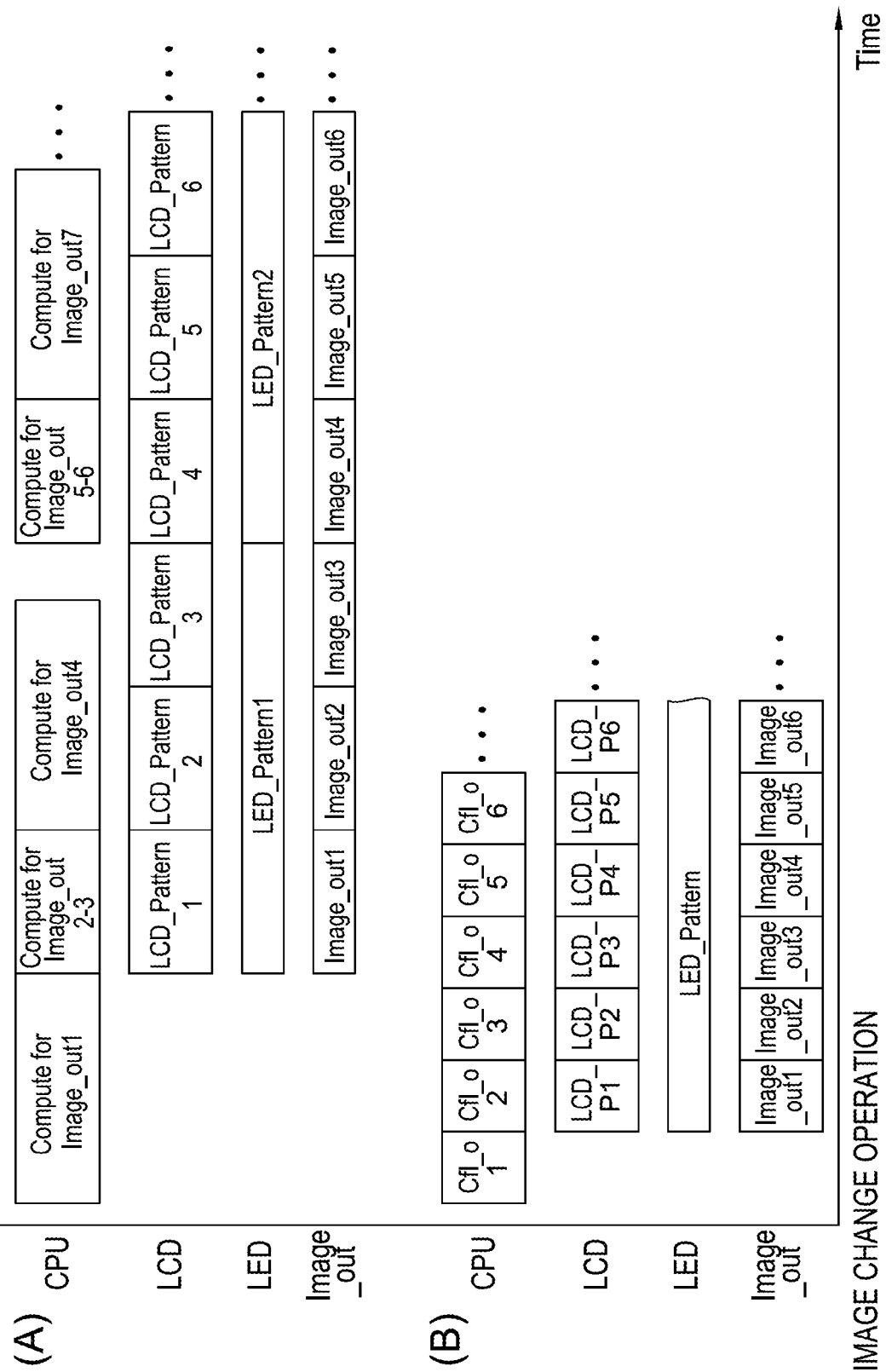
FIG. 14 is a comparison diagram for comparing processes of computing the LCD and LED pattern signals in (A) for the special area control mode and (B) for the equalization mode.

At this time, as shown in (A) portion of FIG. 14, "Compute for Image_out1, 4, 7, . . . " in the special area control mode compute both the LED pattern signal and the LCD pattern signal, which takes time for the process of computing as compared to "Compute for Image_out2,3,5,6, . . . " where the process of computing only the LCD pattern signal is performed.

In contrast to this, as shown in (B) portion of FIG. 14, in the equalization mode, all "Compute for Image_out" (abbreviated as CfI_o in the figure) perform the process of computing only the LCD pattern signal "LCD_Pattern" (abbreviated as LCD_P in the figure). For this reason, the process of computing is simplified in the equalization mode as compared to the special area control mode, further decreasing the amount of processing time. Consequently, particularly in a case where the change speed of the displayed image is fast, for example, a high speed scroll operation or the like is performed, further improved response speed of the liquid crystal display device 12 can prevent displaying the liquid crystal display device 12 from not following the high speed scroll operation or the like.

Note though the local dimming control is not performed in the equalization mode, the image quality of the displayed image is rarely affected even without performing the local dimming control when the high speed scroll operation or the like is performed, causing no particular problem.

[Smartphone in Fourth Embodiment]

Figure 15:
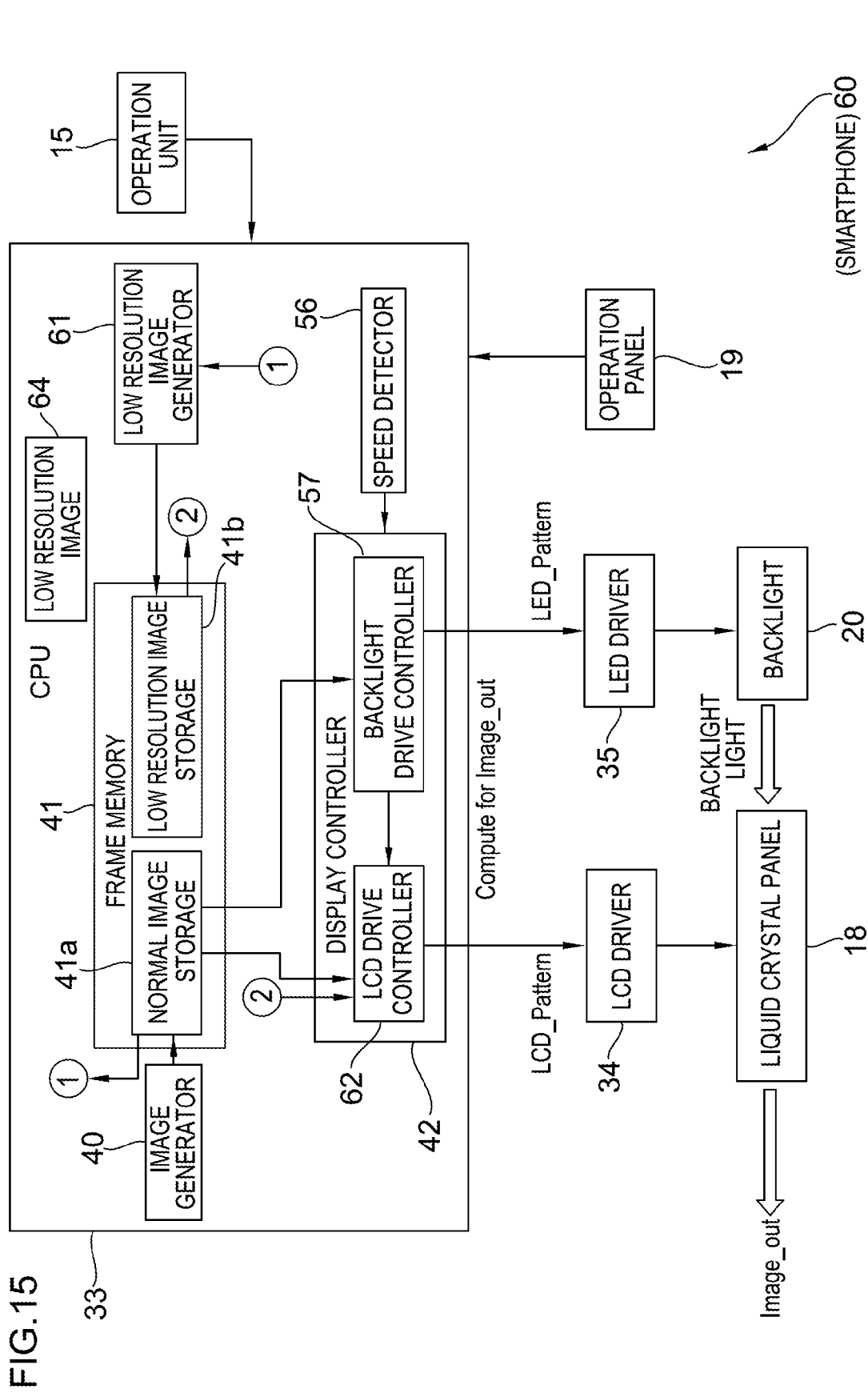
FIG. 15 is a block diagram illustrating an electrical configuration of a smartphone for generating an LCD pattern signal on the basis of a low resolution image in a fourth embodiment.

Next, a description is given of a smartphone 60 according to a fourth embodiment of the invention using FIG. 15. In the third embodiment above, the luminances of the respective illumination parts 20*a* are equalized in the equalization mode to further improve the response speed of the liquid crystal display device 12. In contrast to this, the smartphone 60 in the fourth embodiment reduces a resolution of the displayed image to improve the response speed of the liquid crystal display device 12 as compared to the third embodiment.

The smartphone 60 has the basically same configuration as the smartphone 55 in the third embodiment except that the frame memory 41 is provided with a normal image storage 41*a* and a low resolution image storage 41*b*, and the CPU 33 is provided with a low resolution image generator (second image generator) 61 and an LCD drive controller 62. Therefore, those having the same function and configuration as in the third embodiment above are designated with the same reference numerals and characters, and the description thereof is omitted.

The normal image storage 41*a* stores therein the image signal for the displayed image generated by the image generator (first image generator) 40. The low resolution image storage 41*b* corresponding to a storing unit according to the invention stores therein an image signal for a low resolution image 64 generated by the low resolution image generator 61.

Every time an image signal for a new displayed image is stored in the normal image storage 41*a*, the low resolution image generator 61 reads out the image signal for this displayed image and generates an image signal for the low resolution image 64 having a resolution lower than this displayed image to store the image signal for the low resolution image 64 in the low resolution image storage 41*b*. Here, the low resolution image 64 also includes an image having intermediate pixel values each selected from a local region of 3×3 pixels in the original image. A generating method of the low resolution image 64 is not specifically limited.

The LCD drive controller 62, when the backlight drive controller 57 is set to the normal area control mode or the special area control mode, performs the same process as the LCD drive controller 47 in the above embodiments. However, the LCD drive controller 62, when the backlight drive controller 57 is set to the equalization mode, uses the image signal for the low resolution image 64 stored in the low resolution image storage 41*b* to generate the LCD pattern signal "LCD_Pattern".

<Smartphone Workings in Fourth Embodiment>

Figure 16:
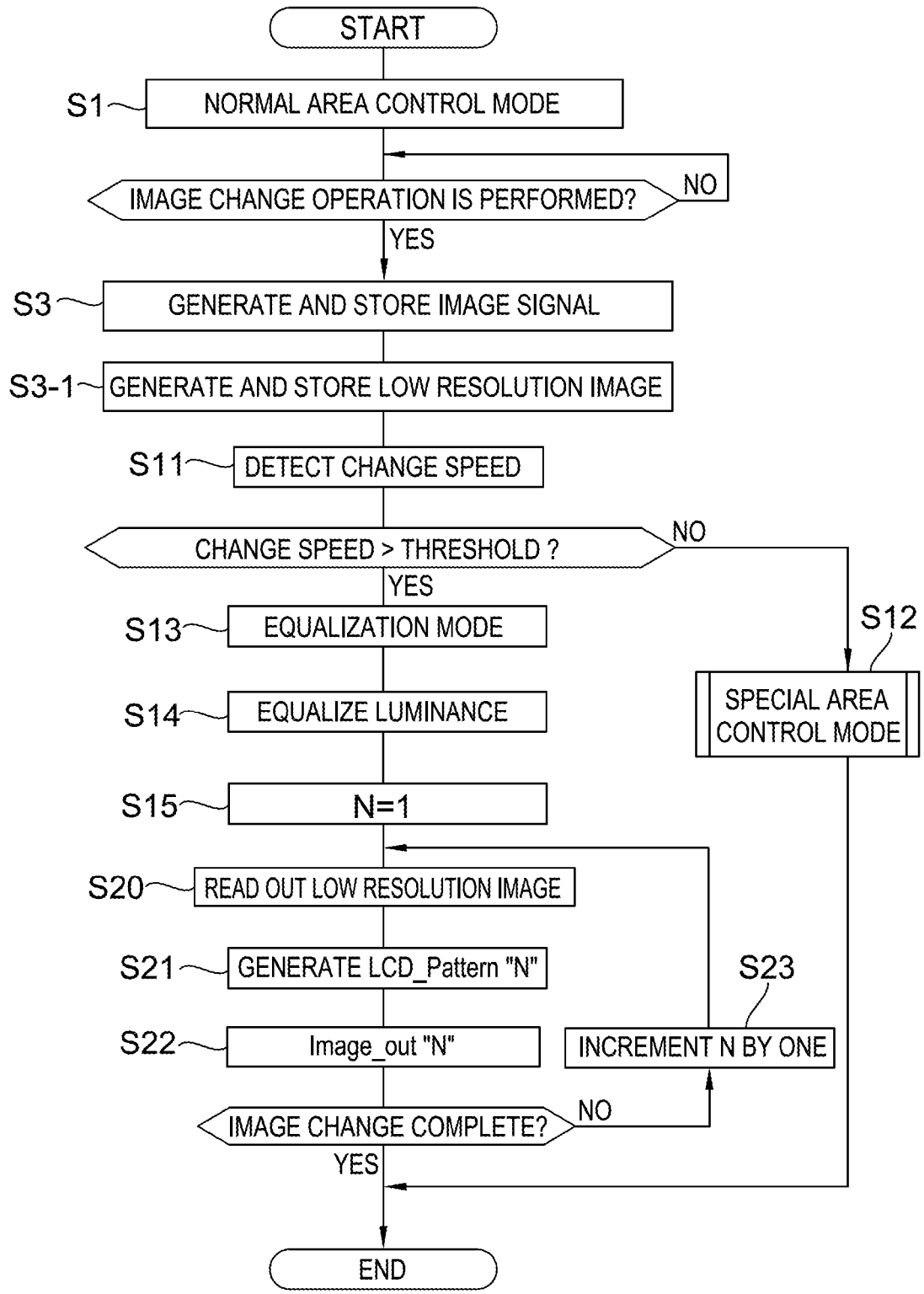
FIG. 16 is a flowchart showing a flow of a display process of the smartphone in the fourth embodiment.

A description is given of workings of a smartphone 60 having the above configuration using a flowchart shown in FIG. 16. Note the processes are the same as those in the first embodiment described above, from when the image change operation such as the scroll operation is performed (step S1) until the image signal for the displayed image corresponding to the scroll operation is stored in the frame memory 41 (step S3), and therefore, the description thereof is omitted.

The low resolution image generator 61, every time an image signal for a new displayed image is stored in the normal image storage 41a, reads out the image signal for this displayed image to generate the low resolution image 64 regardless of the detection result by the speed detector 56 (operation mode of the backlight drive controller 57). The image signal for the low resolution image 64 is successively stored in the low resolution image storage 41b (step S3-1).

Similarly to the third embodiment described above, the speed detector 56 detects the speed of the scroll operation (step S11), and if the operating speed of the scroll operation is equal to or less than the threshold, the backlight drive controller 57 is switched to the special area control mode (step S12), and if the operating speed of the scroll operation is higher than the threshold, the backlight drive controller 57 is switched to the equalization mode (step S13). When the backlight drive controller 57 is switched to the equalization mode, the fixed LED pattern signal "LED_Pattern" is determined, which fixed "LED_Pattern" is output to the LED driver 35 (step S14).

Next, the display controller 42 starts "Compute for Image_out1" for a process of computing the pattern signal for displaying the first frame image (Image_out1: N=1) (step S15). Since, similarly to the third embodiment, "LED_Pattern" is fixed, the backlight drive controller 57 does not perform the process of computing. The LCD drive controller 62 reads out the image signal for the low resolution image 64 corresponding to the first frame image from the low resolution image storage 41b (step S20). Then, the LCD drive controller 62 computes the LCD pattern signal "LCD_Pattern1" on the basis of the image signal read out from the low resolution image storage 41b and the equalized luminance values of the respective illumination parts 20a, and thereafter, outputs this "LCD_Pattern1" to the LCD driver 34 (step S21).

Similarly to the third embodiment, the luminances of the respective illumination parts 20a are controlled to be equalized on the basis of the fixed "LED_Pattern" to control the light transmittance (tone) of each liquid crystal element 18a on the basis of "LCD_Pattern1". This allows the low resolution image of the first frame to be displayed, "Image_out1", on the display region of the liquid crystal panel 18 (step S22).

The LCD drive controller 62, after completion of "Compute for Image_out1", reads out the image signal for the low resolution image 64 corresponding to the second frame image from the low resolution image storage 41b (steps S23, S20). On the basis of this image signal, the LCD drive controller 62 computes, "Compute for Image_out2", the LCD pattern signal "LCD_Pattern2" to output the signal to the LCD driver 34 (step S21). This allows the low resolution image of the second frame to be displayed, "Image_out2", on the liquid crystal panel 18 (step S22).

Subsequently, similarly to the above, the display controller 42 performs "Compute for Image_out3", "Compute for Image_out4", . . . "Compute for Image_outN" in this order to compute and output respective pattern signals, and thereby, scrolls the displayed image on the liquid crystal panel 18 in response to the scroll operation. This process is repeatedly performed until the scroll operation is completed.

In the fourth embodiment, the LCD pattern signal ("LCD_Pattern") is computed on the basis of the image signal for the low resolution image 64, decreasing the amount of time taken for the process of computing the LCD pattern signal as compared to the third embodiment. In other words, the amount of time can be decreased which is taken for each "Compute for Image_out(CfI_o)" described above shown in FIG. 14. For this reason, the response speed of the liquid crystal display device 12 can be further improved as compared to the third embodiment. Note when the high speed scroll operation or the like is performed, image quality degradation is indistinctive even if the low resolution image 64 is displayed, causing no particular problem.

[Smartphone in Fifth Embodiment]

Figure 17:
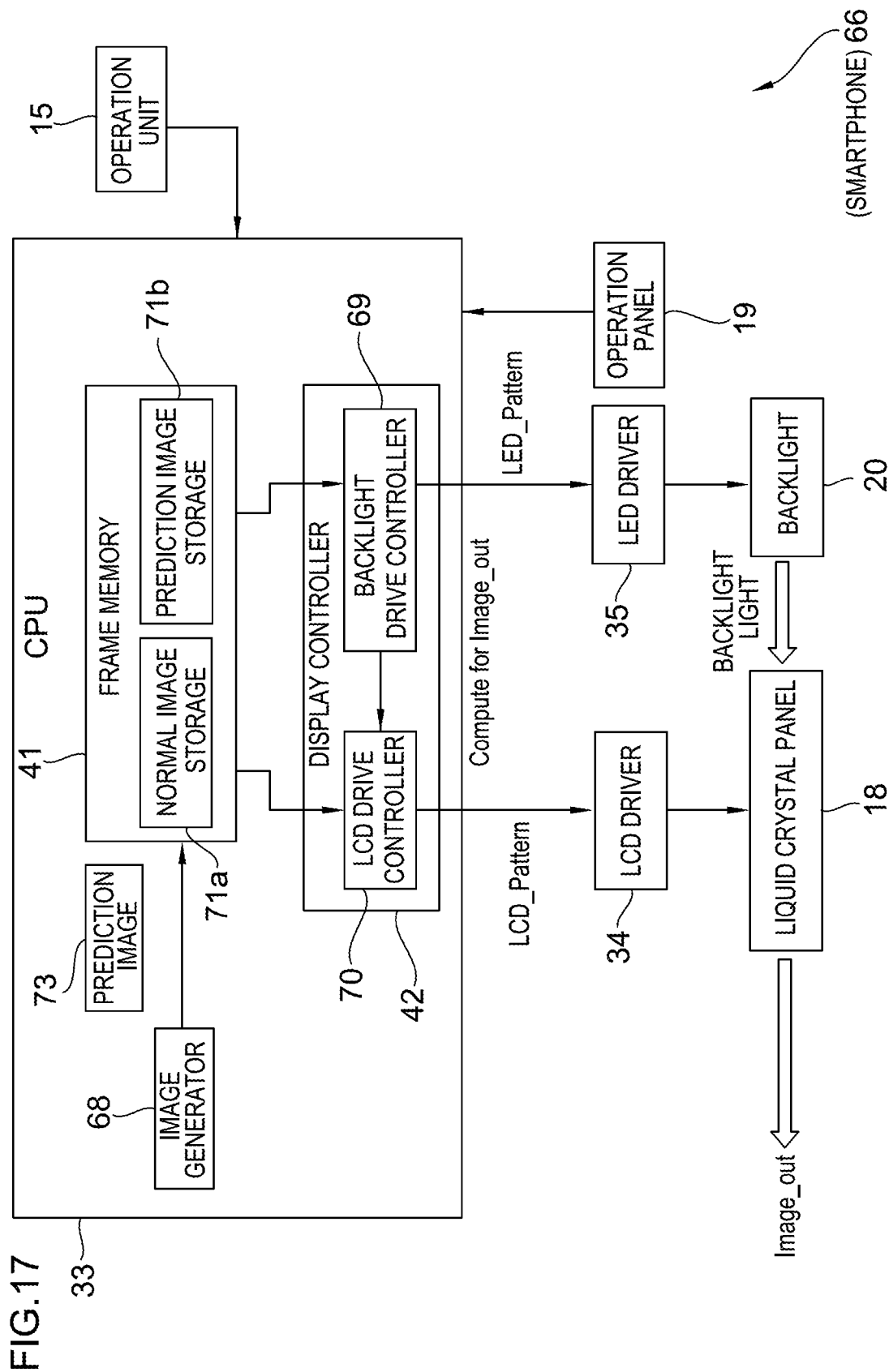
FIG. 17 a block diagram illustrating an electrical configuration of a smartphone for generating in advance a displayed image (prediction image) corresponding to the image change operation such as the scroll operation in a fifth embodiment.

Next, a description is given of a smartphone 66 according to a fifth embodiment of the invention using FIG. 17. In the above embodiments, when the image change operation such as the scroll operation is performed, the displayed image corresponding to this image change operation is generated, however, the smartphone 66 in the fifth embodiment generates in advance the displayed image corresponding to the image change operation before the image change operation is made.

The smartphone 66 has the basically same configuration as the smartphone 10 in the first embodiment except that the CPU 33 is provided with an image generator (third image generator) 68, backlight drive controller 69, and LCD drive controller 70. Therefore, those having the same function and configuration as in the first embodiment above are designated with the same reference numerals and characters, and the description thereof is omitted.

The image generator 68, similarly to the image generator 40 in the above embodiments, generates the image signals for various displayed images such as the desktop screen and the application software execution screen to store the image signals in the normal image storage 71a of the frame memory 41. However, the image generator 68 reads out the image signal for the displayed image which is being displayed on the liquid crystal panel 18 from the normal image storage 71a to predict and generate, on the basis of this image signal, an image likely to be displayed on the liquid crystal panel 18 (e.g., scrolled image, zoomed image or the like) when the scroll operation or the zoom operation is made. Then, the image generator 68 stores the image signal for a predicted prediction image 73 in a prediction image storage 71b of the frame memory 41. The image signal for the prediction image 73 is constantly generated and stored.

The backlight drive controller 69 and the LCD drive controller 70 perform the basically same processes as the backlight drive controller 46 and the LCD drive controller 47, respectively, in the first embodiment. However, the backlight drive controller 69 reads out the image signal for the prediction image 73 corresponding to the image change operation such as the scroll operation from the prediction image storage in the special area control mode. Then, the backlight drive controller 69 analyzes the luminance information on the image signal read out from the prediction image storage 71b to compute the LED pattern signal, and outputs this LED pattern signal to the LED driver 35. The backlight drive controller 69 computes the backlight luminance distribution data to output the backlight luminance distribution data to the LCD drive controller 70 similarly to the first embodiment.

The LCD drive controller 70, when the backlight drive controller 69 is set to the special area control mode, reads out the image signal for the prediction image 73 corresponding to the image change operation such as the scroll operation from the prediction image storage 71b. Then, the LCD drive controller 70 computes the LCD pattern signal on the basis of the image signal read out from the prediction image storage 71b and the backlight luminance distribution data input from the backlight drive controller 69 to output the LCD pattern signal to the LCD driver 34.

<Smartphone Workings in Fifth Embodiment>

Figure 18:
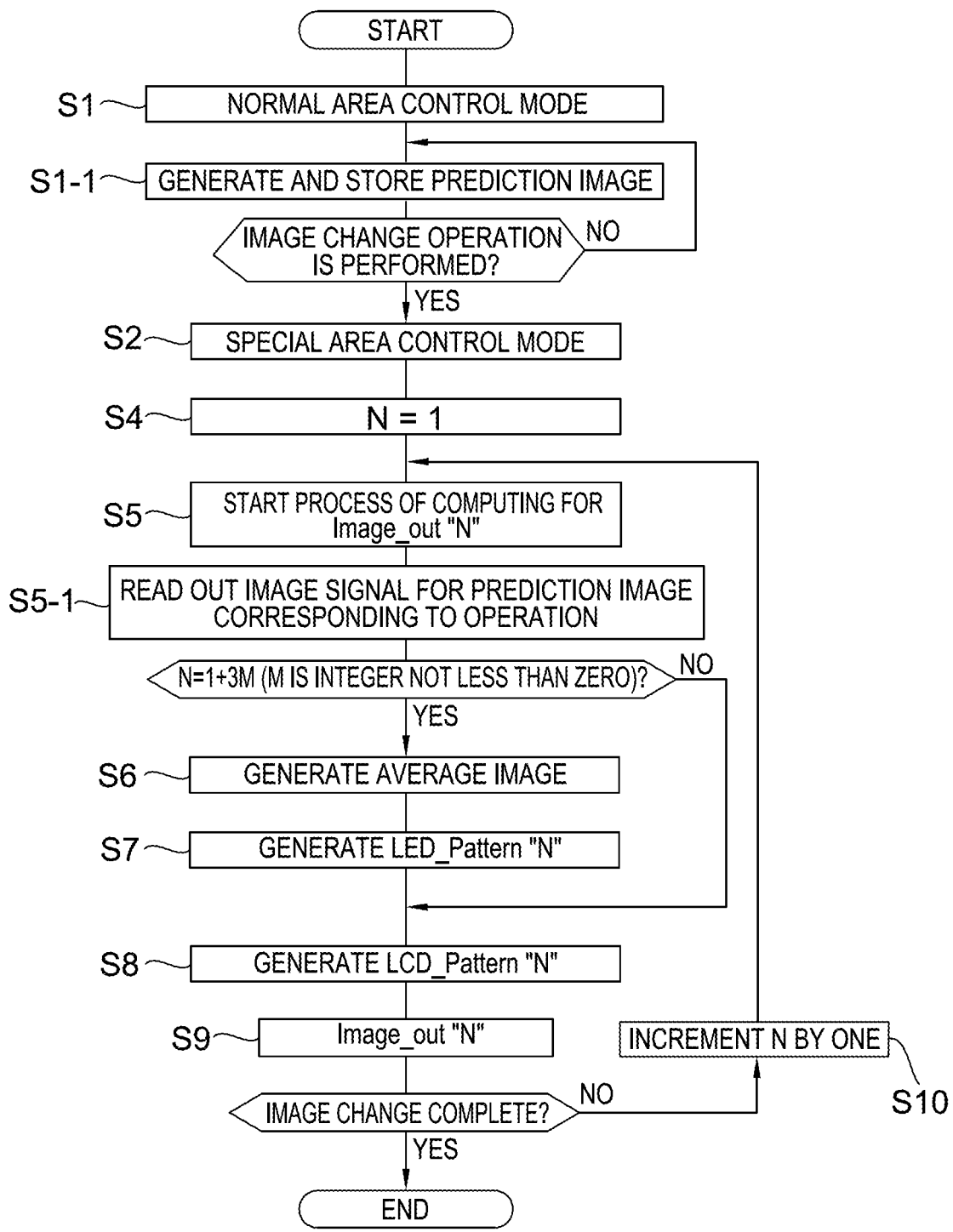
FIG. 18 is a flowchart showing a flow of a display process of the smartphone in the fifth embodiment.

A description is given workings of the smartphone 66 having the above configuration using FIG. 18. When the backlight drive controller 69 is in the normal area control mode (step S1), that is, before the image change operation is made, the image generator 68 generates and stores in normal image storage 71a the image signals for various images to be displayed, as well as the display controller 42 performs the display control corresponding to the normal area control mode.

Figure 19:
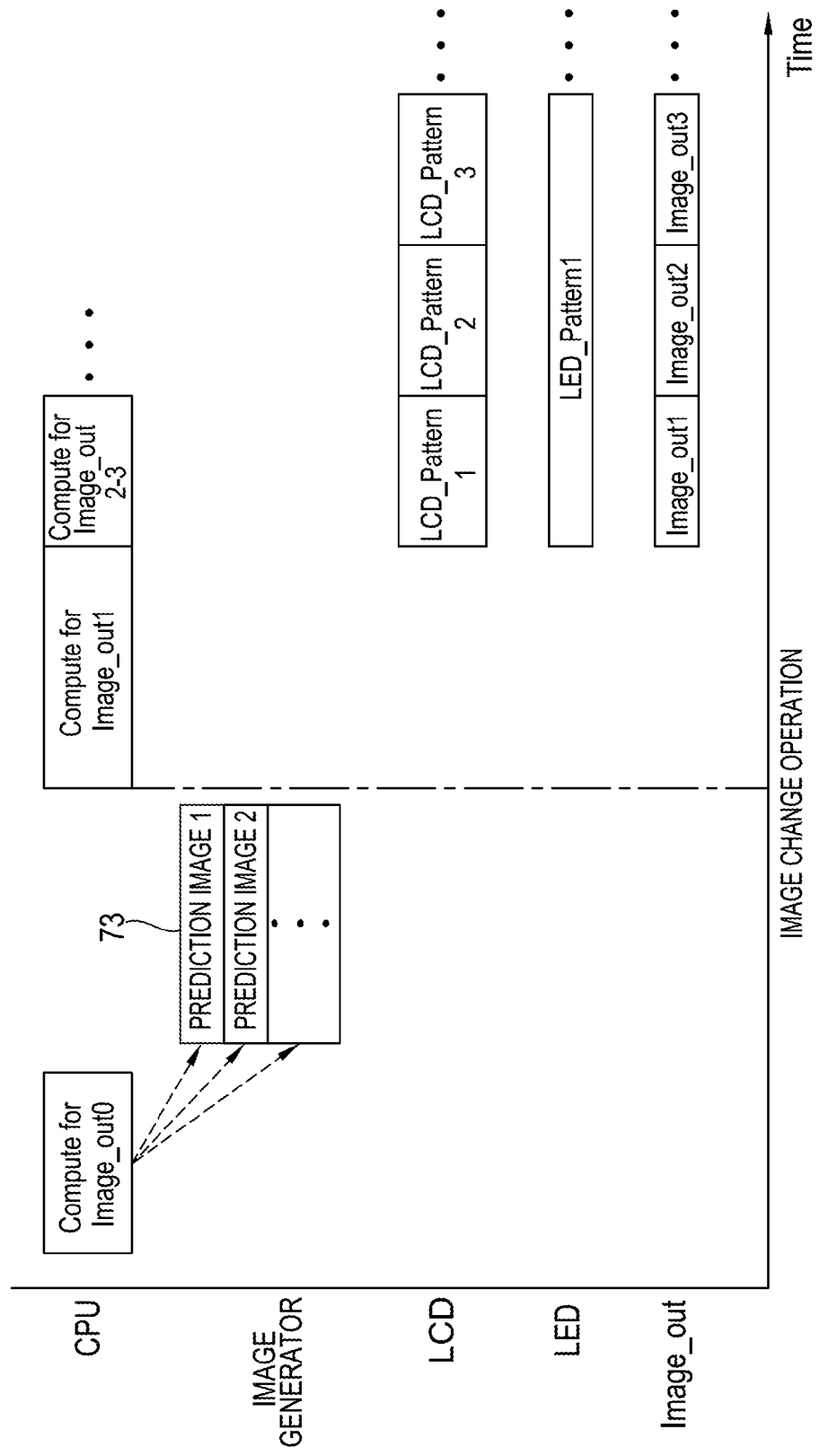
FIG. 19 is an illustration for explaining a process of generating the prediction image.

As shown in FIG. 19, the image generator 68 reads out the image signal corresponding to the displayed image which is being displayed on the liquid crystal panel 18 from the normal image storage 71a to generate, on the basis of this image signal, the image signal for the prediction image 73 corresponding to the scroll operation or the zoom operation ("Compute for Image_out0"). For example, "prediction image 1" includes plural frame images corresponding to the scroll operation, and "prediction image 2" includes plural frame images corresponding to the zoom operation.

Returning to FIG. 18, the image generator 68 stores the image signal for the generated prediction image 73 in the prediction image storage 71b (step S1-1).

When the image change operation, for example, the scroll operation of displayed image is made on the operation unit 15 or the operation panel 19, the display controller 42 switches the operation mode of the backlight drive controller 69 to the special area control mode (step S2).

Next, the display controller 42 starts "Compute for Image_out1" for a process of computing the pattern signal for displaying the first frame image (Image_out1:N=1) (steps S4, S5).

The backlight drive controller 69 reads out the image signals for the prediction image 73 of three frames (image signals for the first to third frame images P1, P2, and P3) corresponding to the scroll operation from the prediction image storage 71b (step S5-1). Subsequently, similarly to the first embodiment above, the backlight drive controller 69 computes the LED pattern signal "LED_Pattern1" on the basis of the average image 49 generated from the respective image signals to output this "LED_Pattern1" to the LED driver 35 (steps S6, S7). The backlight drive controller 69 outputs the backlight luminance distribution data computed from the image signal for the average image 49 to the LCD drive controller 70.

The LCD drive controller 70 reads out the image signal for the prediction image 73 of one frame (image signal for the first frame image P1) corresponding to the scroll operation from the prediction image storage 71b (step S5-1). Subsequently, similarly to the first embodiment above, the LCD drive controller 70 computes the LCD pattern signal "LCD_Pattern1" on the basis of the image signal for the first frame image and the backlight luminance distribution data, and thereafter, outputs this "LCD_Pattern1" to the LCD driver 34 (step S8). This allows the first frame image to be displayed, "Image_out1", on the display region of the liquid crystal panel 18 (step S9).

The display controller 42, after completion of "Compute for Image_out1", performs "Compute for Image_out2" and "Compute for Image_out3" in this order. Consequently, the LCD drive controller 70 computes "LCD_Pattern1" and "LCD_Pattern2" in this order on the basis of the image signal read out from the prediction image storage 71b. Then, similarly to the first embodiment, "LED_Pattern1" and "LCD_Pattern2" are output to the LED driver 35, and then, "LED_Pattern1" and "LCD_Pattern3" are output to the LCD driver 34 to display the second frame image and the third frame image on the liquid crystal panel 18 (Image_out2, Image_out3).

Subsequently, similarly to the first embodiment, "Compute for Image_out4", "Compute for Image_out5", "Compute for Image_out6", ... "Compute for. Image_outN" are performed in this order, to compute and generate the respective pattern signals, and thereby, the displayed image on the liquid crystal panel 18 is scrolled in response to the scroll operation. These processes are repeatedly performed until the scroll operation is completed.

In this way, the smartphone 66 in the fifth embodiment also, in "Compute for Image_out" for a process of computing the pattern signal for displaying the N≠(1+3M)th frame image, computes only the LCD pattern signal, obtaining an effect similar to the effect described in the first embodiment. Further, in the fifth embodiment, the prediction image 73 corresponding to the image change operation such as the scroll operation is generated and stored in advance, enabling the faster response as compared to the first embodiment in which the displayed image corresponding to the image change operation is generated when this operation is made.

Modification Example of Fifth Embodiment

It is possible to adequately combine the configuration in the fifth embodiment in which the prediction image 73 is generated corresponding to the image change operation such as the scroll operation and the configurations in the second to fourth embodiments above. For example, the fourth embodiment and the fifth embodiment may be combined to generate the low resolution image 64 (see FIG. 15) from the prediction image 73.

Figure 20:
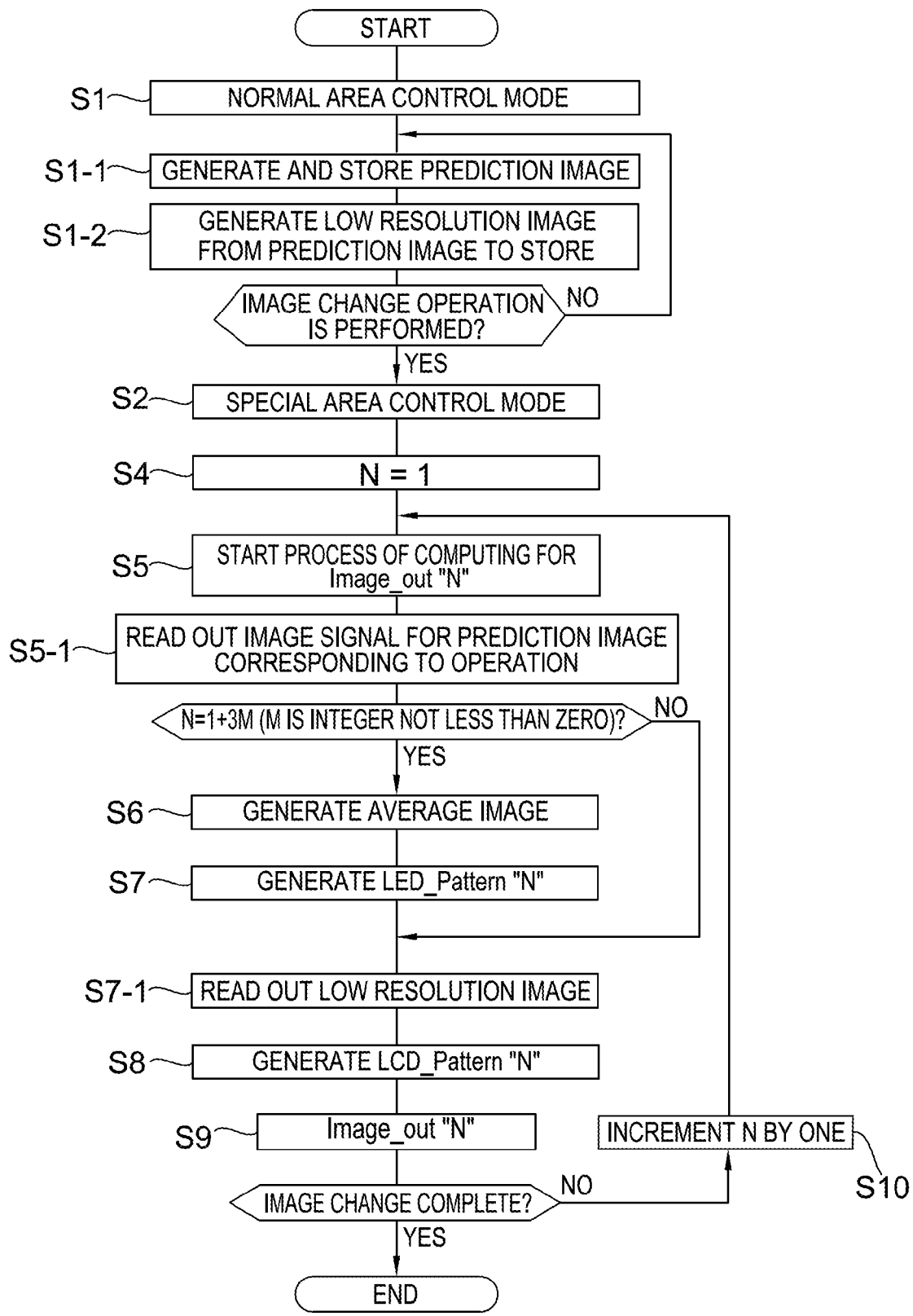
FIG. 20 is a flowchart showing a flow of a display process of the smartphone in a case of combining the fourth embodiment and the fifth embodiment.
Figure 21:
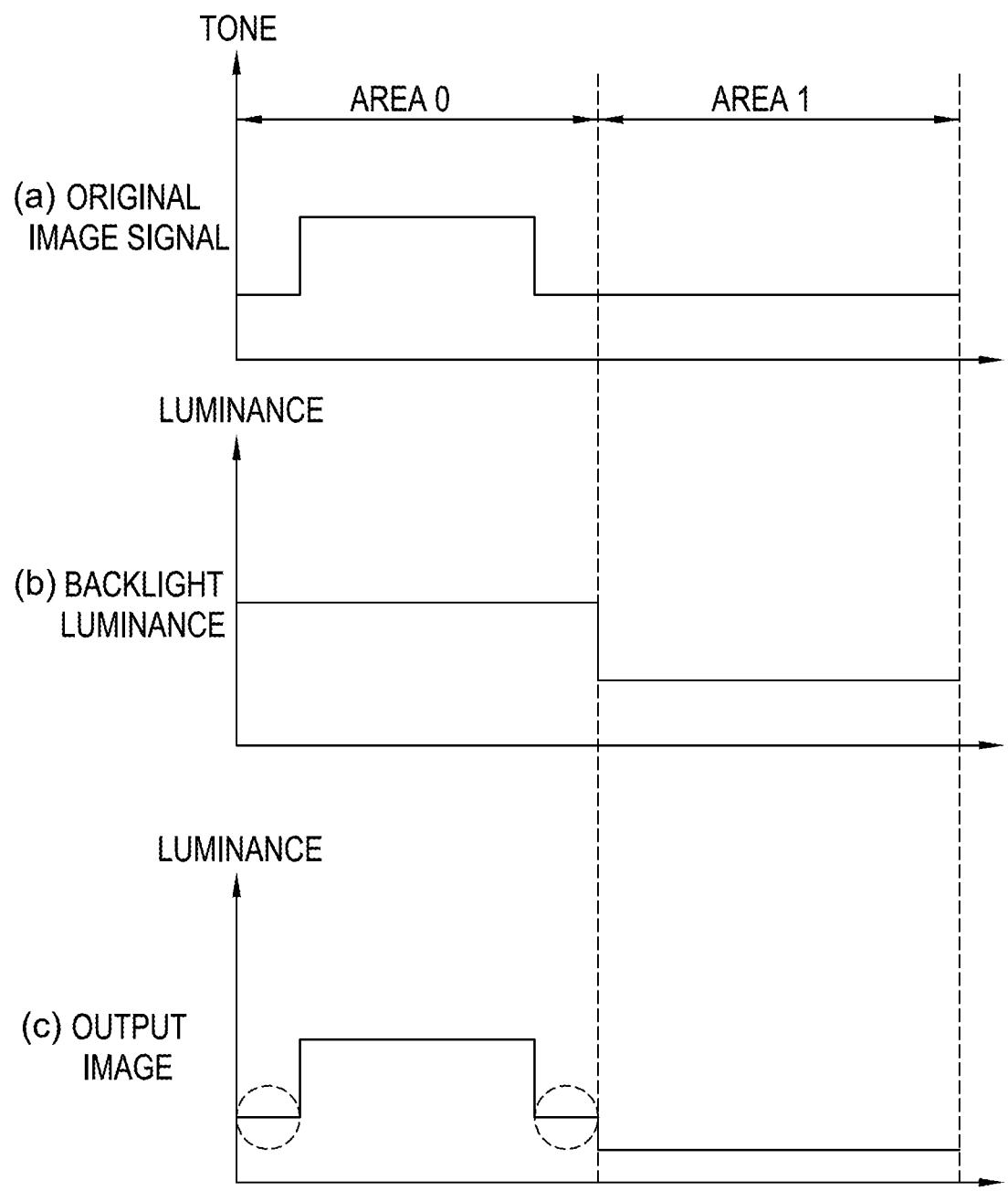
FIG. 21 is an illustration showing image quality degradation in a case of performing local dimming control without performing image signal correction.
Figure 22:
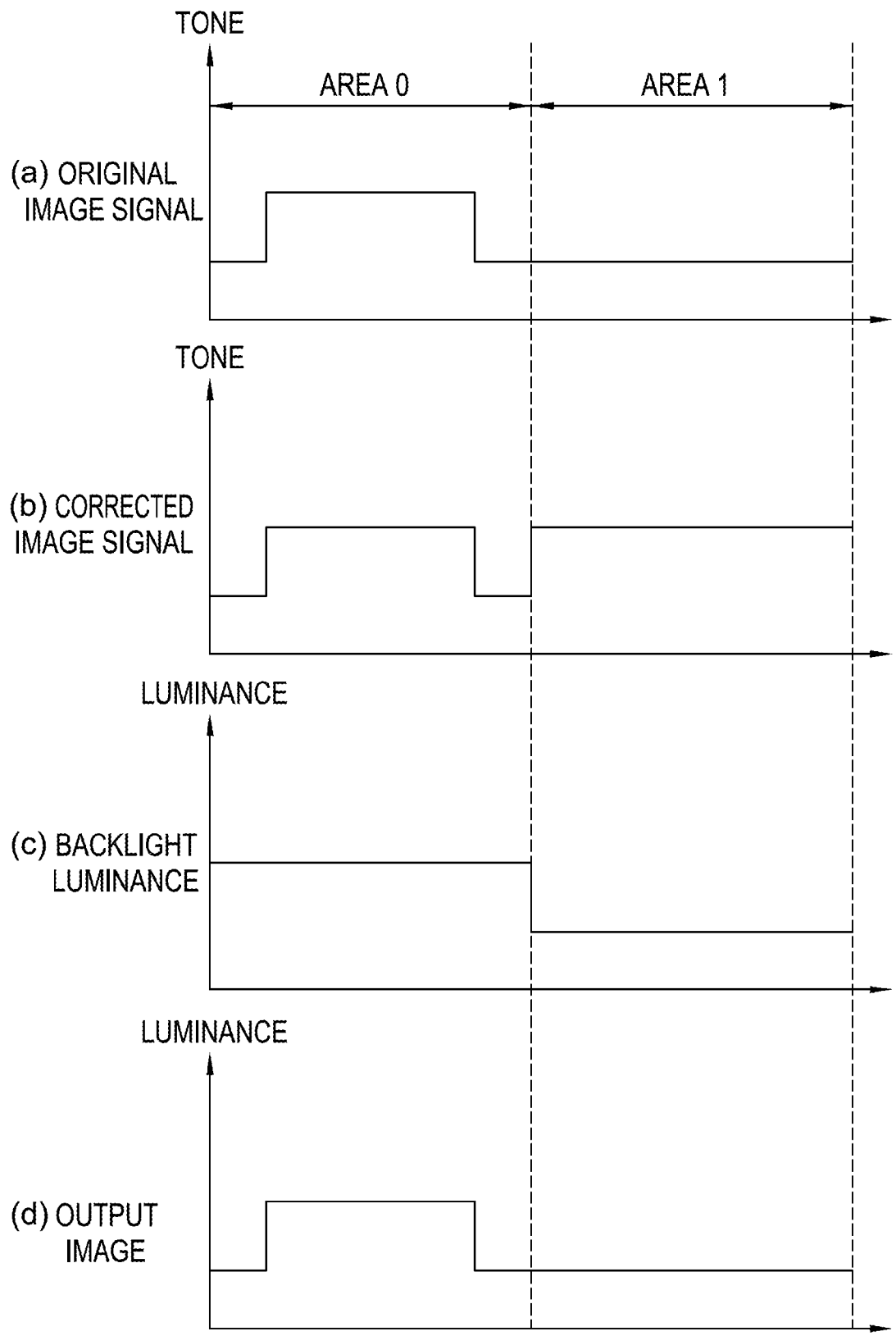
FIG. 22 is an illustration showing reduction of the image quality degradation owing to image signal correction.

As shown in FIG. 20, in the case of combining the fourth embodiment and the fifth embodiment, the low resolution image generator 61 (see FIG. 15) generates the low resolution image 64 on the basis of the prediction image 73 stored in prediction image storage 71b to store the low resolution image in the low resolution image storage 41b (step S1-2). The LCD drive controller 70 (see FIG. 15) generates the LCD pattern signal on the basis of the image signal for the low resolution image 64 generated from the prediction image 73. This enables the faster response when the high speed scroll operation or the like is performed as compared to the fourth embodiment.

[Others]

In the above embodiments, the scroll operation, cited as an example, is specifically used as the image change operation for description, but the present invention can be applied to the case of performing various image change operations to change the displayed image such as the zoom operation or the displayed image switching operation.

In the above embodiments, the LED 23 is used as a light source for each illumination part 20a, but various light sources can be used other than the LED.

In the above embodiments, the LED pattern signal common to three frames is computed in the special area control mode, but the LED pattern signal common to two frames, or four or more frames may be computed.

In the above embodiments, the liquid crystal display device including a so-called direct backlight arranged on the back side of the liquid crystal panel 18, cited as an example, is used as the backlight 20 for description, but the present invention can be applied to various liquid crystal display devices capable of the local dimming control, for example, the liquid crystal display device including a so-called edge type backlight arranged on the lateral side of the liquid crystal panel 18.

In the above embodiments, the liquid crystal display device used in the smartphone, cited as an example, is used for description, but the present invention can be applied to the liquid crystal display devices used in the mobile phone and various mobile terminals such as a PDA, TV, photo frame, various monitors or the like.

What is claimed is:

1. A liquid crystal display device comprising:
   a liquid crystal panel having a plurality of liquid crystal elements two-dimensionally arrayed thereon;
   a backlight having a plurality of illumination parts each of which respectively illuminates each of a plurality of areas, the areas being obtained by dividing a display region of the liquid crystal panel;
   a liquid crystal panel drive controller separately controlling light transmittances of the plurality of liquid crystal elements on the basis of an image signal to display an image on the display region; and
   a backlight drive controller determining a luminance pattern defining a magnitude of luminance of each of the plurality of illumination parts on the basis of luminance information on the image signal corresponding to each area to perform an area control for separately controlling the luminances of the plurality of illumination parts in accordance with the luminance pattern, the backlight drive controller having a special area control mode for performing the area control by determining the luminance pattern common to a plurality of frames of the image displayed on the display region,
   wherein the backlight drive controller, in the special area control mode, performs computation of an average value of the luminances of respective pixels of the image on the basis of the image signal of the image for the plurality of frames to determine the luminance pattern on the basis of a result of the computation.

2. The liquid crystal display device according to claim 1, further comprising:
   an operation unit accepting an image change operation to change the image displayed on the display region; and
   a first image generator generating an image signal for the image corresponding to the image change operation,
   wherein
      the backlight drive controller performs the special area control mode when the image change operation is made on the operation unit.

3. The liquid crystal display device according to claim 2, wherein the image change operation includes a scroll operation of the image and a zoom operation of the image.

4. The liquid crystal display device according to claim 2, further comprising a speed detector detecting a speed of change in the image which changes accompanying the image change operation,
wherein
   the backlight drive controller performs an equalization mode for controlling the luminances of the plurality of illumination parts to be equalized when the speed detected by the speed detector is higher than a predetermined threshold.

5. The liquid crystal display device according to claim 4, further comprising a second image generator generating an image signal for a low resolution image which has a resolution lower than the image generated by the first image generator on the basis of the image signal for the image generated by the first image generator,
wherein
   the liquid crystal panel drive controller separately controls the light transmittances of the plurality of liquid crystal elements on the basis of the image signal for the low resolution image generated by the second image generator when the speed detected by the speed detector is higher than a predetermined threshold.

6. The liquid crystal display device according to claim 5, further comprising a storing unit storing the image signal for the low resolution image,
wherein
   the second image generator generates in advance the image signal for the low resolution image to store the image signal for the low resolution image in the storing unit before the liquid crystal panel drive controller determines that the speed is higher than the threshold, and
   the liquid crystal panel drive controller separately controls the light transmittances of the plurality of liquid crystal elements on the basis of the image signal for the low resolution image read out from the storing unit when the speed detected by the speed detector is higher than a predetermined threshold.

7. The liquid crystal display device according to claim 2, wherein
   the first image generator generates in advance an image signal for the image likely to be displayed on the display region on the basis of the image signal for the image displayed on the display region when the image change operation is made, and
   when the image change operation is made on the operation unit, the liquid crystal panel drive controller separately controls the light transmittance of the plurality of liquid crystal elements on the basis of the image signal for the image generated in advance by the first image generator, and the backlight drive controller determines the luminance pattern on the basis of the luminance information on the relevant image signal to perform the area control.

8. The liquid crystal display device according to claim 1, wherein each of the plurality of illumination parts includes a light emitting diode.

9. The liquid crystal display device according to claim 1, wherein
   the backlight drive controller obtains an average image by performing computation of average values of the luminances at respective pixels of the plurality of the frames to determine the luminance pattern on the basis of the average image.

10. A liquid crystal display device comprising:
    a liquid crystal panel having a plurality of liquid crystal elements two-dimensionally arrayed thereon;
    a backlight having a plurality of illumination parts each of which respectively illuminates each of a plurality of areas, the areas being obtained by dividing a display region of the liquid crystal panel;
    a liquid crystal panel drive controller separately controlling light transmittances of the plurality of liquid crystal elements on the basis of an image signal to display an image on the display region; and
    a backlight drive controller determining a luminance pattern defining a magnitude of luminance of each of the plurality of illumination parts on the basis of luminance information on the image signal corresponding to each area to perform an area control for separately controlling the luminances of the plurality of illumination parts in accordance with the luminance pattern, the backlight drive controller having a special area control mode for performing the area control by determining the luminance pattern common to a plurality of frames of the image displayed on the display region, wherein the backlight drive controller, in the special area control mode, compares magnitudes of the luminances of the respective pixels of the image on the basis the image signal of the image for the plurality of frames and finds a maximum value of the luminances of the respective pixels to determine the luminance pattern on the basis of the maximum value of the luminances of the respective pixels.

11. The liquid crystal display device according to claim 10, further comprising:
an operation unit accepting an image change operation to change the image displayed on the display region; and
a first image generator generating an image signal for the image corresponding to the image change operation, wherein
the backlight drive controller performs the special area control mode when the image change operation is made on the operation unit.

12. The liquid crystal display device according to claim 11, wherein the image change operation includes a scroll operation of the image and a zoom operation of the image.

13. The liquid crystal display device according to claim 11, further comprising a speed detector detecting a speed of change in the image which changes accompanying the image change operation, wherein
the backlight drive controller performs an equalization mode for controlling the luminances of the plurality of illumination parts to be equalized when the speed detected by the speed detector is higher than a predetermined threshold.

14. The liquid crystal display device according to claim 13, further comprising a second image generator generating an image signal for a low resolution image which has a resolution lower than the image generated by the first image generator on the basis of the image signal for the image generated by the first image generator, wherein
the liquid crystal panel drive controller separately controls the light transmittances of the plurality of liquid crystal elements on the basis of the image signal for the low resolution image generated by the second image generator when the speed detected by the speed detector is higher than a predetermined threshold.

15. The liquid crystal display device according to claim 14, further comprising a storing unit storing the image signal for the low resolution image, wherein
the second image generator generates in advance the image signal for the low resolution image to store the image signal for the low resolution image in the storing unit before the liquid crystal panel drive controller determines that the speed is higher than the threshold, and
the liquid crystal panel drive controller separately controls the light transmittances of the plurality of liquid crystal elements on the basis of the image signal for the low resolution image read out from the storing unit when the speed detected by the speed detector is higher than a predetermined threshold.

16. The liquid crystal display device according to claim 9, wherein
the first image generator generates in advance an image signal for the image likely to be displayed on the display region on the basis of the image signal for the image displayed on the display region when the image change operation is made, and
when the image change operation is made on the operation unit, the liquid crystal panel drive controller separately controls the light transmittance of the plurality of liquid crystal elements on the basis of the image signal for the image generated in advance by the first image generator, and the backlight drive controller determines the luminance pattern on the basis of the luminance information on the relevant image signal to perform the area control.

17. The liquid crystal display device according to claim 10, wherein each of the plurality of illumination parts includes a light emitting diode.

* * * * *